United States Patent
Kaufman et al.

(10) Patent No.: US 7,148,887 B2
(45) Date of Patent: Dec. 12, 2006

(54) SYSTEM AND METHOD FOR PERFORMING A THREE-DIMENSIONAL VIRTUAL SEGMENTATION AND EXAMINATION WITH OPTICAL TEXTURE MAPPING

(75) Inventors: Arie E. Kaufman, Plainview, NY (US); Zhengrong Liang, Stony Brook, NY (US); Mark R. Wax, Greenlawn, NY (US); Ming Wan, Stony Brook, NY (US); Dongquing Chen, Stony Brook, NY (US)

(73) Assignee: The Research Foundation of State University of New York, Stonybrook, NY (US)

( * ) Notice: Subject to any disclaimer, the term of this patent is extended or adjusted under 35 U.S.C. 154(b) by 615 days.

(21) Appl. No.: 09/974,548

(22) Filed: Oct. 10, 2001

(65) Prior Publication Data

US 2002/0045153 A1    Apr. 18, 2002

Related U.S. Application Data

(60) Division of application No. 09/343,012, filed on Jun. 29, 1999, now Pat. No. 6,331,116, which is a continuation-in-part of application No. 08/714,697, filed on Sep. 16, 1996, now Pat. No. 5,971,767.

(60) Provisional application No. 60/125,041, filed on Mar. 18, 1999.

(51) Int. Cl.
*G06T 15/00* (2006.01)

(52) U.S. Cl. .................. 345/419; 345/582; 345/589; 345/423; 434/262; 434/267; 434/272

(58) Field of Classification Search ................ 345/582, 345/419, 423, 589; 434/262, 267, 272
See application file for complete search history.

(56) References Cited

U.S. PATENT DOCUMENTS

| | | | |
|---|---|---|---|
| 4,367,216 A | 1/1983 | Mutzel et al. | |
| 4,391,280 A | 7/1983 | Miller | |
| 4,630,203 A | 12/1986 | Szirtes | |
| 4,710,876 A | 12/1987 | Cline et al. | |
| 4,719,585 A | 1/1988 | Cline et al. | |
| 4,729,098 A | 3/1988 | Cline et al. | |
| 4,737,921 A | 4/1988 | Goldwasser et al. | |

(Continued)

FOREIGN PATENT DOCUMENTS

WO    9613207    5/1996

(Continued)

OTHER PUBLICATIONS

Hong et al., "3D Virtual Colonoscopy," 1995 Biomedical Visualization Proceedings, pp. 26-32 and 83 (1995).

(Continued)

*Primary Examiner*—Kimbinh T. Nguyen
(74) *Attorney, Agent, or Firm*—Dorsey & Whitney LLP

(57) ABSTRACT

A system and method for generating a three-dimensional visualization image of an object such as an organ using volume visualization techniques and exploring the image using a guided navigation system which allows the operator to travel along a flight path and to adjust the view to a particular portion of the image of interest in order, for example, to identify polyps, cysts or other abnormal features in the visualized organ. An electronic biopsy can also be performed on an identified growth or mass in the visualized object. Virtual colonoscopy can be enhanced by electronically removing residual stool, fluid and non-colonic tissue from the image of the colon, by employing bowel preparation followed by image segmentation operations. Methods are also employed for virtually expanding regions of colon collapse using image segmentation results.

5 Claims, 13 Drawing Sheets

U.S. PATENT DOCUMENTS

| | | | |
|---|---|---|---|
| 4,751,643 A | 6/1988 | Lorensen et al. | |
| 4,791,567 A | 12/1988 | Cline et al. | |
| 4,823,129 A | 4/1989 | Nelson | |
| 4,831,528 A | 5/1989 | Crawford et al. | |
| 4,874,362 A | 10/1989 | Wiest et al. | |
| 4,879,668 A | 11/1989 | Cline et al. | |
| 4,984,157 A | 1/1991 | Cline et al. | |
| 4,985,834 A | 1/1991 | Cline et al. | |
| 4,985,856 A | 1/1991 | Kaufman | |
| 4,987,554 A | 1/1991 | Kaufman | |
| 4,993,415 A | 2/1991 | Long | |
| 5,006,109 A | 4/1991 | Douglas et al. | |
| 5,023,072 A | 6/1991 | Cheng | |
| 5,038,302 A | 8/1991 | Kaufman | |
| 5,047,772 A | 9/1991 | Ribner | |
| 5,095,521 A | 3/1992 | Trousset et al. | |
| 5,101,475 A | 3/1992 | Kaufman | |
| 5,127,037 A | 6/1992 | Bynum | |
| 5,166,876 A | 11/1992 | Cline et al. | |
| 5,170,347 A | 12/1992 | Tuy et al. | |
| 5,187,658 A | 2/1993 | Cline et al. | |
| 5,204,625 A | 4/1993 | Cline et al. | |
| 5,229,935 A | 7/1993 | Yamagishi et al. | |
| 5,245,538 A | 9/1993 | Lis | |
| 5,261,404 A | 11/1993 | Mick et al. | |
| 5,265,012 A | 11/1993 | Amans et al. | |
| 5,270,926 A | 12/1993 | Tam | |
| 5,283,837 A | 2/1994 | Wood | |
| 5,295,488 A | 3/1994 | Lloyd et al. | |
| 5,299,288 A | 3/1994 | Glassman et al. | |
| 5,322,070 A | 6/1994 | Goodman et al. | |
| 5,345,490 A | 9/1994 | Finnigan et al. | |
| 5,361,763 A | 11/1994 | Kao et al. | |
| 5,365,927 A | 11/1994 | Roemer et al. | |
| 5,371,778 A | 12/1994 | Yanof et al. | |
| 5,442,733 A | 8/1995 | Kaufman et al. | |
| 5,458,111 A | 10/1995 | Coin | |
| 5,611,025 A | 3/1997 | Lorensen et al. | |
| 5,630,034 A | 5/1997 | Oikawa et al. | |
| 5,699,799 A | 12/1997 | Xu et al. | |
| 5,734,384 A | 3/1998 | Yanof et al. | |
| 5,782,762 A | 7/1998 | Vining | |
| 5,971,767 A | 10/1999 | Kaufman | |
| 5,986,662 A | 11/1999 | Argiro et al. | |
| 6,084,407 A * | 7/2000 | Ellis | 324/300 |
| 6,130,671 A | 10/2000 | Argiro | |
| 6,219,059 B1 | 4/2001 | Argiro | |
| 6,272,366 B1 | 8/2001 | Vining | |
| 6,317,137 B1 * | 11/2001 | Rosasco | 345/582 |
| 6,556,210 B1 * | 4/2003 | Yamamoto et al. | 345/582 |
| 6,603,877 B1 * | 8/2003 | Bishop | 382/165 |

FOREIGN PATENT DOCUMENTS

| | | |
|---|---|---|
| WO | 9811524 | 3/1998 |
| WO | 9837517 | 8/1998 |
| WO | 0055812 | 9/2000 |
| WO | 0055814 | 9/2000 |

OTHER PUBLICATIONS

Hong et al., "3D Reconstruction and Visualization of the Inner Surface of the Colon from Spiral CT Data," IEEE, pp. 1506-1510 (1997).

William E. Lorensen, "The Exploration of Cross-Sectional Data with a Virtual Endscope," Interactive Technology and the New Health Paradigm, IOS Press, pp. 221-230 (1995).

Hagen H. et al., "Methods for Surface Interrogation", Proceedings of the Conference on Visulatization vol. CONF 1 pp. 187-193,1990.

Chen et al., "A tree-branch searching, multiresolution approach to skeletonization for virtual endscopy".

Liang Z. et al., "Feasibility Studies on Extracting Bladder Wall from MR Images for Virtual Cystoscopy",.

Chen et al., "Virtual Laryngoscopy: Feasibility Studies by CT and MRI", IEEE Medical Imaging Conference, Nov. 1999.

Chen et al., A multi-scan MRI-based virtual cystoscopy.

Chen et al., "MRI-Based Virtual Cystoscopy: The image segmentation and visualization", SPIE Conference, Feb. 12-18, 2000.

Chen et al., "A Fast Algorithm to Generate Centerline for Virtual Colonscopy", SPIE Conference, Feb. 12-18, 2000.

Richard Robb, "Virtual (Computed) Endoscopy: Development and Evalution Using the Visible Human Datasets", Oct, 7-8, 1996. www.mayo.edu.

Adam L. Peneberg, "From Stony Brook, a New Way to Examine Colon, Externally," The New York Times, p. 6 (1996).

David J. Vining, "Virtual Colonoscopy," Advance for Administrators in Radiology, pp. 50-52 (1998).

Zhou et al., "Three-Dimesional Skeleton and Centerline Generation Based on an Approximate Minimum Distance Field," The Visual Computer, 14:303-314 (1998).

Liang Z et al., "Inclusion of a priori information in segmentation of colon lumen for 3D virtual colonscopy", 1997 IEEE Nuclear Science Symposium Conference Record, pp. 1423-1427, vol. 2.

Valev et al., "Techniques of CT colongraphy (virtual colonscopy)", Critical Reviews in Biomedical Engineering, 1999, Begall House, vol. 27, No. 1-2, pp. 1-25.

Shibolet O et al., "Coloring voxel-based objects for virtual endscopy", IEEE Symposium on Volume Visualization, Research Triangle, Oct. 1998.

Kaufman A., Wan M., "Disobstruction of Colon Wall Collapse", Project Description, online www.cs.sunysb.edu, Jan. 1999.

Holzapfel G A, et al., "Large strain analysis of soft biological membrances: formulation and finite element analysis", Computer Methods in Applied Mechanics and Engineering, vol. 132, No. 1-2, pp. 45-61, 1996.

Kaye J. et al., "A 3D virtual environment for modeling mechanical cardiopulmonary interactings", CVRMED-MRCA '97, pp. 389-398, 1997.

Burgard W. et al., "Active mobile robot localization by entrophy minimization", Proceedings second euromicro workshop on advanced mobile robots, pp. 155-162, 1997.

Suya You et al., "Interactive volume rendering for virtual colonscopy", Proceedings Visualization '97, pp. 433-436, 571.

Pai D.K. et al., "Multiresolution Rough Terrain Motion Planning", IEEE Transactions in Robotics and Automatic, 14, No. 1, pp. 19-33, 1998.

* cited by examiner

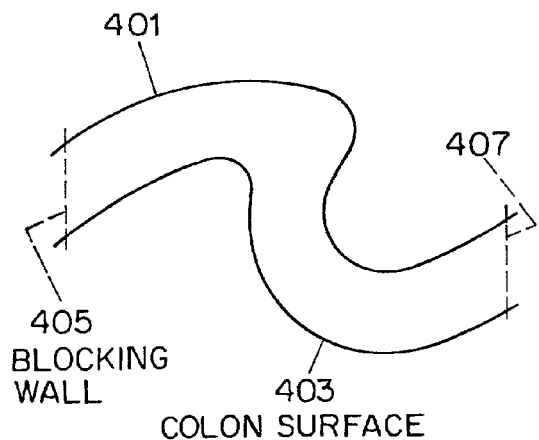
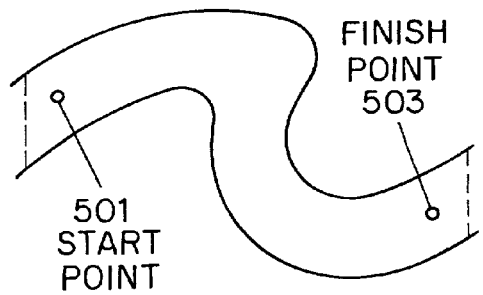
FIG. 4
FIG. 5
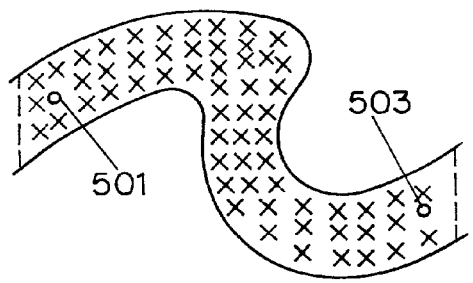
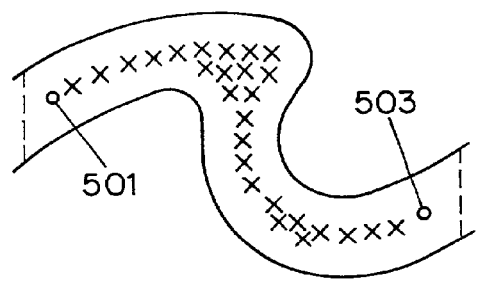
FIG. 6
FIG. 7
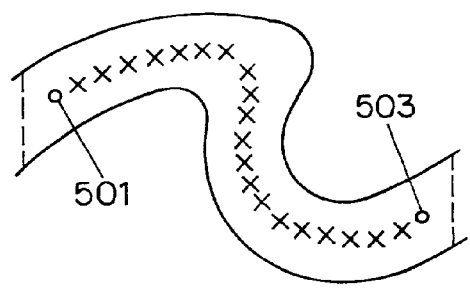
FIG. 8

SYSTEM AND METHOD FOR PERFORMING A THREE-DIMENSIONAL VIRTUAL SEGMENTATION AND EXAMINATION WITH OPTICAL TEXTURE MAPPING

CROSS-REFERENCE to RELATED APPLICATIONS

This application is a divsional application of U.S. patent application, Ser. No. 09/343,012, now U.S. Pat No. 6,331,116 filed on Jun. 29, 1999 and entitled "Systems And Method For Performing a Three-Dimensional Virtual Segmentation And Examination," now issued as U.S. Pat. No. 6,331,116, which is a continuation-in-part of U.S. patent application, Ser. No. 08/714,697, now U.S. Pat. No. 5,971,767 filed on Sep. 16, 1996, and entitled "Systems and Method for Performing a Three Dimensional Virtual Examination," now issued as U.S. Pat. No. 5,971,767, and also claims the benefit of U.S. Provisional Patent Application, Ser. No. 60/125,041, filed on Mar. 18, 1999, entitled "Three Dimensional Virtual Examination."

STATEMENT REGARDING FEDERALLY FUNDED RESEARCH

Work related to the present invention was supported by grants from the National Institute of Health, Grant Nos. NIH R21 CA79180, Automatic Colon Segmentation for 3D Virtual Colonoscopy; and NIH R01 CA82402, Developing Virtual Colonoscopy for Cancer Screening. The U.S. Government may have rights to the invention.

TECHNICAL FIELD

The present invention relates to a system and method for performing a volume based three-dimensional virtual examination using planned and guided navigation techniques. One such application is performing a virtual endoscopy.

BACKGROUND OF THE INVENTION

Colon cancer continues to be a major cause of death throughout the world. Early detection of cancerous growths, which in the human colon initially manifest themselves as polyps, can greatly improve a patient's chance of recovery. Presently, there are two conventional ways of detecting polyps or other masses in the colon of a patient. The first method is a colonoscopy procedure, which uses a flexible fiber-optic tube called a colonoscope to visually examine the colon by way of physical rectal entry with the scope. The doctor can manipulate the tube to search for any abnormal growths in the colon. The colonoscopy, although reliable, is both relatively costly in money and time, and is an invasive, uncomfortable painful procedure for the patient.

The second detection technique is the use of a barium enema and two-dimensional X-ray imaging of the colon. The barium enema is used to coat the colon with barium, and a two-dimensional X-ray image is taken to capture an image of the colon. However, barium enemas may not always provide a view of the entire colon, require extensive pretreatment and patient manipulation, is often operator-dependent when performing the operation, exposes the patient to excessive radiation and can be less sensitive than a colonoscopy. Due to deficiencies in the conventional practices described above, a more reliable, less intrusive and less expensive way to check the colon for polyps is desirable. A method to examine other human organs, such as the lungs, for masses in a reliable, cost effective way and with less patient discomfort is also desirable.

Two-dimensional ("2D") visualization of human organs employing currently available medical imaging devices, such as computed tomography and MRI (magnetic resonance imaging), has been widely used for patient diagnosis. Three-dimensional images can be formed by stacking and interpolating between two-dimensional pictures produced from the scanning machines. Imaging an organ and visualizing its volume in three-dimensional space would be beneficial due to its lack of physical intrusion and the ease of data manipulation. However, the exploration of the three-dimensional volume image must be properly performed in order to fully exploit the advantages of virtually viewing an organ from the inside.

When viewing the three dimensional ("3D") volume virtual image of an environment, a functional model must be used to explore the virtual space. One possible model is a virtual camera which can be used as a point of reference for the viewer to explore the virtual space. Camera control in the context of navigation within a general 3D virtual environment has been previously studied. There are two conventional types of camera control offered for navigation of virtual space. The first gives the operator full control of the camera which allows the operator to manipulate the camera in different positions and orientations to achieve the view desired. The operator will in effect pilot the camera. This allows the operator to explore a particular section of interest while ignoring other sections. However, complete control of a camera in a large domain would be tedious and tiring, and an operator might not view all the important features between the start and finishing point of the exploration. The camera could also easily get "lost" in remote areas or be "crashed" into one of the walls by an inattentive operator or by numerous unexpected obstacles.

The second technique of camera control is a planned navigation method, which assigns the camera a predetermined path to take and which cannot be changed by the operator. This is akin to having an engaged "autopilot". This allows the operator to concentrate on the virtual space being viewed, and not have to worry about steering into walls of the environment being examined. However, this second technique does not give the viewer the flexibility to alter the course or investigate an interesting area viewed along the flight path.

It would be desirable to use a combination of the two navigation techniques described above to realize the advantages of both techniques while minimizing their respective drawbacks. It would be desirable to apply a flexible navigation technique to the examination of human or animal organs which are represented in virtual 3D space in order to perform a non-intrusive painless thorough examination. The desired navigation technique would further allow for a complete examination of a virtual organ in 3D space by an operator allowing flexibility while ensuring a smooth path and complete examination through and around the organ. It would be additionally desirable to be able to display the exploration of the organ in a real time setting by using a technique which minimizes the computations necessary for viewing the organ. The desired technique should also be equally applicable to exploring any virtual object.

SUMMARY

The invention generates a three-dimensional visualization image of an object such as a human organ using volume visualization techniques and explores the virtual image using a guided navigation system which allows the operator to travel along a predefined flight path and to adjust both the position and viewing angle to a particular portion of interest in the image away from the predefined path in order to identify polyps, cysts or other abnormal features in the organ.

The inventive technique for three-dimensional virtual examination of an object includes producing a discrete representation of the object in volume elements, defining the portion of the object which is to be examined, performing a navigation operation in the virtual object and displaying the virtual object in real time during the navigation.

The inventive technique for a three-dimensional virtual examination as applied to an organ of a patient includes preparing the organ for scanning, if necessary, scanning the organ and converting the data into volume elements, defining the portion of the organ which is to be examined, performing a guided navigation operation in the virtual organ and displaying the virtual organ in real time during the guided navigation.

In performing virtual examination, it is often desirable to view a particular material type while removing other material types from the image. To perform such an operation, a method for electronically cleansing an image can be performed by converting the image data to a plurality of volume elements with each volume element having an intensity value. Next, a classifying operation is performed to classify the volume elements into a plurality of clusters in accordance with the intensity values. Once classified, at least one cluster of volume elements can then be removed from the image data.

The classifying operation can be performed by evaluating a plurality of volume elements of the image data with respect to a plurality of neighboring volume elements to determine a neighborhood similarity value for the volume element.

The clusters can be further classified by applying a mixture probability function to the clusters to classify voxels whose intensity value results from inclusion of more than one material type.

An alternative classifying operation includes the steps of performing feature vector analysis on at least one of the clusters which include image data for a material of interest followed by performing high level feature extraction to remove volume elements from the image which are not substantially indicative of the material of interest.

The method according method for electronically cleansing an image is well suited for applications where the image data represents a region of the human body including at least a portion of the colon and the material of interest is tissue of a colon. In colon imaging applications, the removing operation can remove volume elements representing intracolonic fluid, residual stool within the colon, bone, and non-colonic tissue.

It is an object of the invention to use a system and method to perform a relatively painless, inexpensive and non-intrusive in vivo examination of an organ where the actual analysis of the scanned colon can be possibly performed without the patient present. The colon can be scanned and visualized in real-time or the stored data can be visualized at a later time.

It is another object of the invention to generate 3D volume representations of an object, such as an organ, where regions of the object can be peeled back layer by layer in order to provide sub-surface analysis of a region of the imaged object. A surface of an object (such as an organ) can be rendered transparent or translucent in order to view further objects within or behind the object wall. The object can also be sliced in order to examine a particular cross-section of the object.

It is another object of the invention to provide a system and method of guided navigation through a 3D volume representation of an object, such as an organ, using potential fields.

It is a further object of the invention to calculate the center-line of an object, such as an organ, for a virtual fly-through using a peel-layer technique as described herein.

It is still a further object of the invention to use a modified Z buffer technique to minimize the number of computations required for generating the viewing screen.

It is another object of the invention to assign opacity coefficients to each volume element in the representation in order to make particular volume elements transparent or translucent to varying degrees in order to customize the visualization of the portion of the object being viewed. A section of the object can also be composited using the opacity coefficients.

BRIEF DESCRIPTION OF THE DRAWINGS

Further objects, features and advantages of the invention will become apparent from the following detailed description taken in conjunction with the accompanying figures showing a preferred embodiment of the invention, on which:

FIG. 4 is a diagram illustrating a two dimensional cross-section of a volumetric colon which identifies two blocking walls;

FIG. 5 is a diagram illustrating a two dimensional cross-section of a volumetric colon upon which start and finish volume elements are selected;

FIG. 6 is a diagram illustrating a two dimensional cross-section of a volumetric colon which shows a discrete sub-volume enclosed by the blocking walls and the colon surface;

FIG. 7 is a diagram illustrating a two dimensional cross-section of a volumetric colon which has multiple layers peeled away;

FIG. 8 is a diagram illustrating a two dimensional cross-section of a volumetric colon which contains the remaining flight path;

DETAILED DESCRIPTION

While the methods and systems described in this application can be applied to any object to be examined, the preferred embodiment which will be described is the examination of an organ in the human body, specifically the colon. The colon is long and twisted which makes it especially suited for a virtual examination saving the patient both money and the discomfort and danger of a physical probe. Other examples of organs which can be examined include the lungs, stomach and portions of the gastro-intestinal system, the heart and blood vessels.

Figure 1:
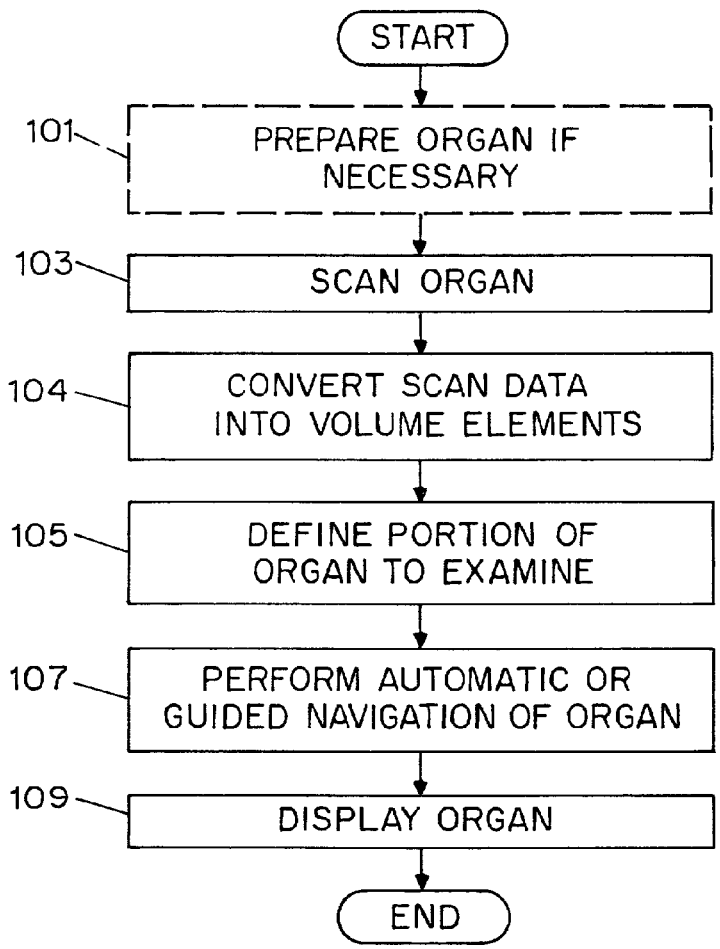
FIG. 1 is a flow chart of the steps for performing a virtual examination of an object, specifically a colon, in accordance with the invention.

FIG. 1 illustrates the steps necessary to perform a virtual colonoscopy using volume visualization techniques. Step 101 prepares the colon to be scanned in order to be viewed for examination if required by either the doctor or the particular scanning instrument. This preparation could include cleansing the colon with a "cocktail" or liquid which enters the colon after being orally ingested and passed through the stomach. The cocktail forces the patient to expel waste material that is present in the colon. One example of a substance used is Golytely. Additionally, in the case of the colon, air or $CO_2$ can be forced into the colon in order to expand it to make the colon easier to scan and examine. This is accomplished with a small tube placed in the rectum with approximately 1,000 cc of air pumped into the colon to distend the colon. Depending upon the type of scanner used, it may be necessary for the patient to drink a contrast substance such as barium to coat any unexpunged stool in order to distinguish the waste in the colon from the colon walls themselves. Alternatively, the method for virtually examining the colon can remove the virtual waste prior to or during the virtual examination as explained later in this specification. Step 101 does not need to be performed in all examinations as indicated by the dashed line in FIG. 1.

Step 103 scans the organ which is to be examined. The scanner can be an apparatus well known in the art, such as a spiral CT-scanner for scanning a colon or a Zenita MRI machine for scanning a lung labeled for example with xenon gas. The scanner must be able to take multiple images from different positions around the body during suspended respiration, in order to produce the data necessary for the volume visualization. An example of a single CT-image would use an X-ray beam of 5 mm width, 1:1 to 2:1 pitch, with a 40 cm field-of-view being performed from the top of the splenic flexure of the colon to the rectum.

Discrete data representations of said object can be produced by other methods besides scanning. Voxel data representing an object can be derived from a geometric model by techniques described in U.S. Pat. No. 5,038,302 entitled "Method of Converting Continuous Three-Dimensional Geometrical Representations into Discrete Three-Dimensional Voxel-Based Representations Within a Three-Dimensional Voxel-Based System" by Kaufman, issued Aug. 8, 1991, filed Jul. 26, 1988, which is hereby incorporated by reference. Additionally, data can be produced by a computer model of an image which can be converted to three-dimension voxels and explored in accordance with this invention. One example of this type of data is a computer simulation of the turbulence surrounding a space shuttle craft.

Step 104 converts the scanned images into three-dimensional volume elements (Voxels). In the preferred embodiment for examining a colon, the scan data is reformatted into 5 mm thick slices at increments of 1 mm or 2.5 mm , with each slice represented as a matrix of 512 by 512 pixels. Thus a large number of 2D slices are generated depending upon the length of the scan. The set of 2D slices is then reconstructed to 3D voxels. The conversion process of 2D images from the scanner into 3D voxels can either be performed by the scanning machine itself or by a separate machine such as a computer with techniques which are well known in the art (for example, see U.S. Pat. No. 4,985,856 entitled "Method and Apparatus for Storing, Accessing, and Processing Voxel-based Data" by Kaufman et al.; issued Jan. 15, 1991, filed Nov. 11, 1988; which is hereby incorporated by reference).

Step 105 allows the operator to define the portion of the selected organ to be examined. A physician may be interested in a particular section of the colon likely to develop polyps. The physician can view a two dimensional slice overview map to indicate the section to be examined. A starting point and finishing point of a path to be viewed can be indicated by the physician/operator. A conventional computer and computer interface (e.g., keyboard, mouse or spaceball) can be used to designate the portion of the colon which is to be inspected. A grid system with coordinates can be used for keyboard entry or the physician/operator can "click" on the desired points. The entire image of the colon can also be viewed if desired.

Step 107 performs the planned or guided navigation operation of the virtual organ being examined. Performing a guided navigation operation is defined as navigating through an environment along a predefined or automatically predetermined flight path which can be manually adjusted by an operator at any time. After the scan data has been converted to 3D voxels, the inside of the organ must be traversed from the selected start to the selected finishing point. The virtual examinations is modeled on having a tiny camera traveling through the virtual space with a lens pointing towards the finishing point. The guided navigation technique provides a level of interaction with the camera, so that the camera can navigate through a virtual environment automatically in the case of no operator interaction, and at the same time, allow the operator to manipulate the camera when necessary. The preferred embodiment of achieving guided navigation is to use a physically based camera model which employs potential fields to control the movement of the camera and which are described in detail in FIGS. 2 and 3.

Figure 9:
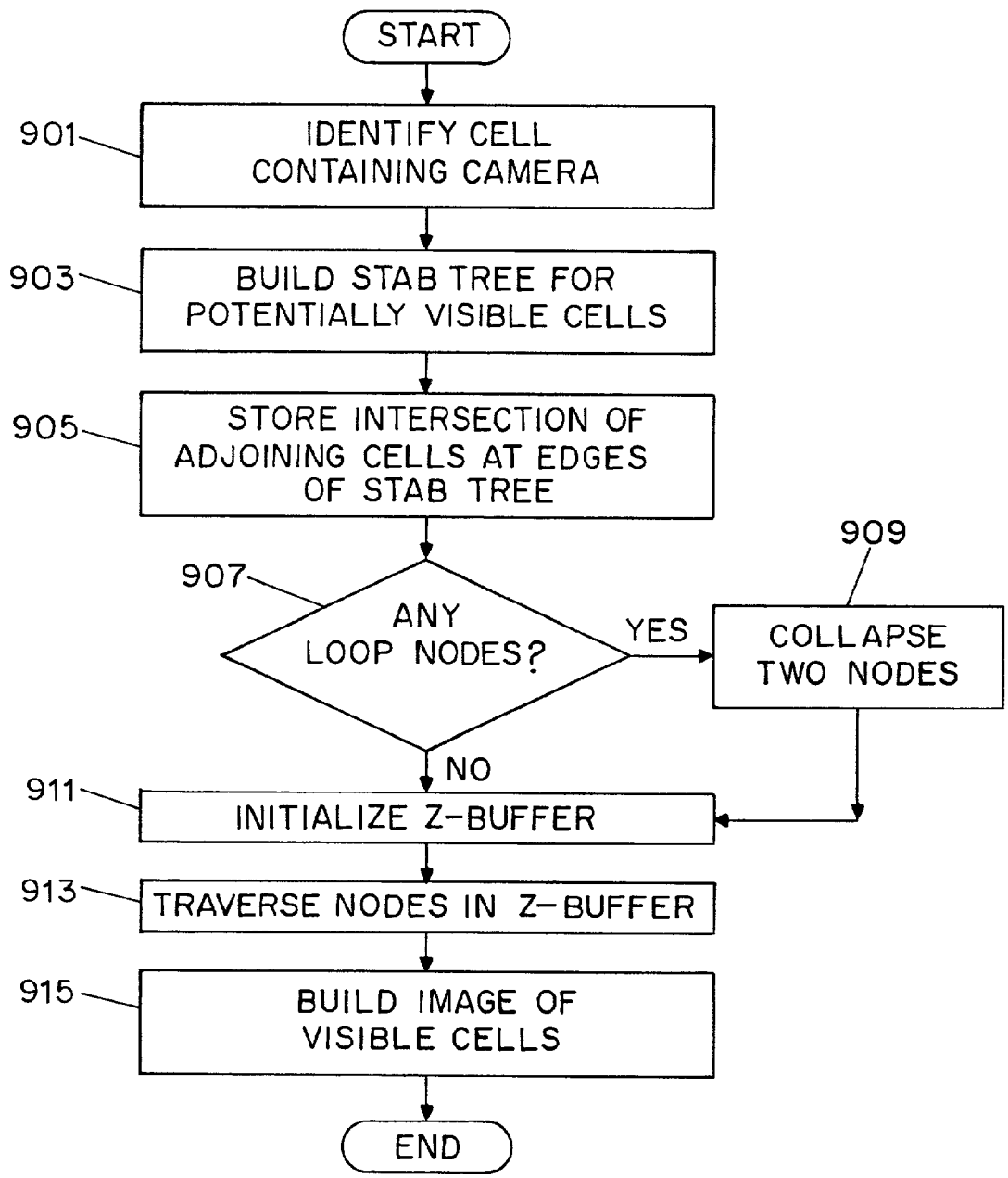
FIG. 9 is a flow chart of the steps of generating a volume visualization of the scanned organ.

Step 109, which can be performed concurrently with step 107, displays the inside of the organ from the viewpoint of the camera model along the selected pathway of the guided navigation operation. Three-dimensional displays can be generated using techniques well known in the art such as the marching cubes technique. However, in order to produce a real time display of the colon, a technique is required which reduces the vast number of computations of data necessary for the display of the virtual organ. FIG. 9 describe this display step in more detail.

The method described in FIG. 1 can also be applied to scanning multiple organs in a body at the same time. For example, a patient may be examined for cancerous growths in both the colon and lungs. The method of FIG. 1 would be modified to scan all the areas of interest in step 103 and to select the current organ to be examined in step 105. For example, the physician/operator may initially select the colon to virtually explore and later explore the lung. Alternatively, two different doctors with different specialties may virtually explore different scanned organs relating to their respective specialties. Following step 109, the next organ to be examined is selected and its portion will be defined and explored. This continues until all organs which need examination have been processed.

The steps described in conjunction with FIG. 1 can also be applied to the exploration of any object which can be represented by volume elements. For example, an architectural structure or inanimate object can be represented and explored in the same manner.

Figure 2:
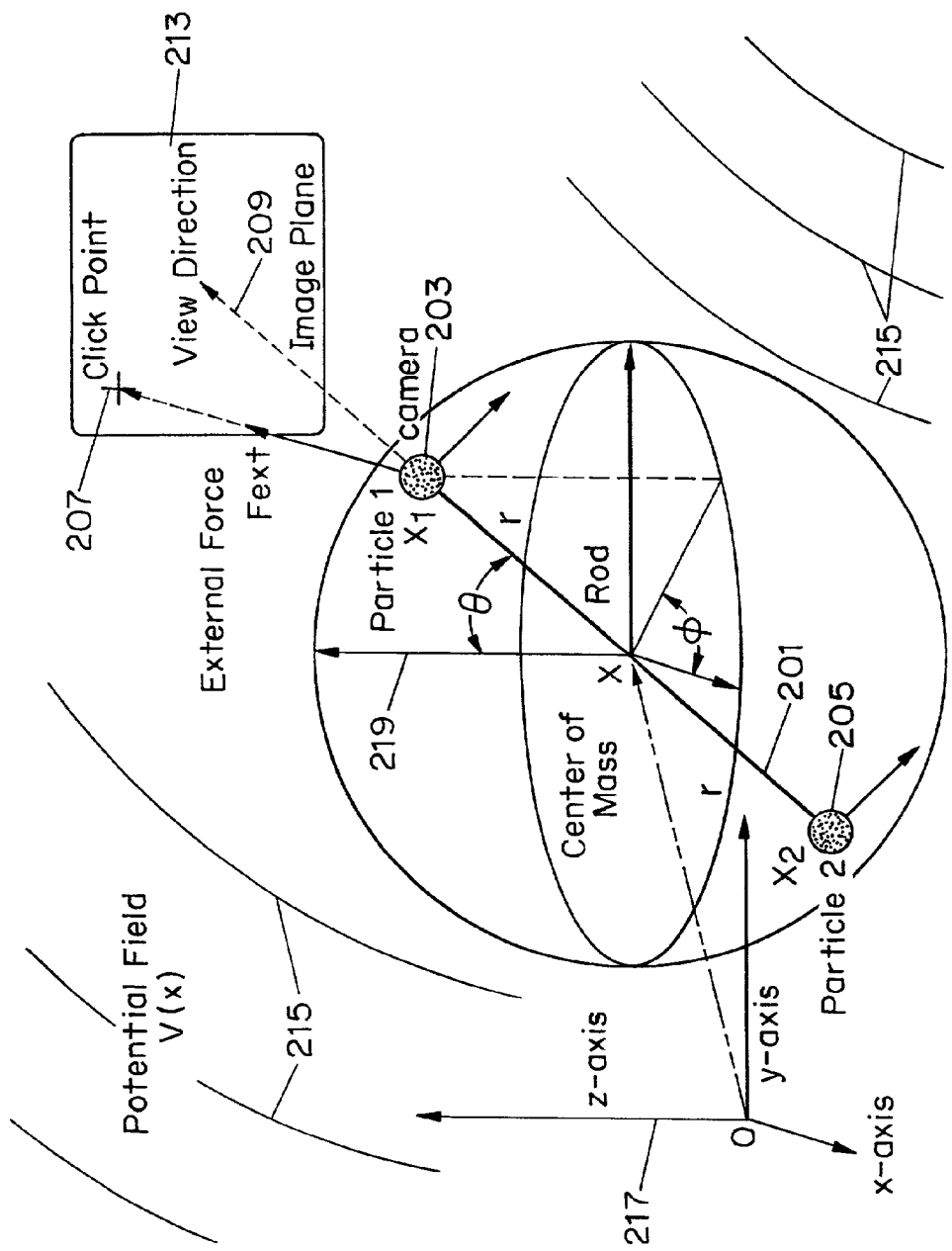
FIG. 2 is an illustration of a "submarine" camera model which performs guided navigation in the virtual organ.

FIG. 2 depicts a "submarine" camera control model which performs the guided navigation technique in step 107. When there is no operator control during guided navigation, the default navigation is similar to that of planned navigation which automatically directs the camera along a flight path from one selected end of the colon to another. During the planned navigation phase, the camera stays at the center of the colon for obtaining better views of the colonic surface. When an interesting region is encountered, the operator of the virtual camera using guided navigation can interactively bring the camera close to a specific region and direct the motion and angle of the camera to study the interesting area in detail, without unwillingly colliding with the walls of the colon. The operator can control the camera with a standard interface device such as a keyboard, mouse or non-standard device such as a spaceball. In order to fully operate a camera in a virtual environment, six degrees of freedom for the camera is required. The camera must be able to move in the horizontal, vertical, and Z direction (axes 217), as well as being able to rotate in another three degrees of freedom (axes 219) to allow the camera to move and scan all sides and angles of a virtual environment. The camera model for guided navigation includes an inextensible, weightless rod 201 connecting two particles $x_1$ 203 and $x_2$ 205, both particles being subjected to a potential field 215. The potential field is defined to be highest at the walls of the organ in order to push the camera away from the walls.

The positions of the particles are given by $x_1$ and $x_2$, and they are assumed to have the same mass m. A camera is attached at the head of the submarine $x_1$ 203, whose viewing direction coincides with $x_2 x_1$. The submarine can perform translation and rotation around the center of mass x of the model as the two particles are affected by the forces from the potential field $V(x)$ which is defined below, any friction forces, and any simulated external force. The relations between $x_1$, $x_2$, and x are as follows:

$$x = (x, y, z),$$

$$r = (r \sin\theta \cos\phi, r \sin\theta \sin\phi, r \cos\theta),$$

$$x_1 = x + r,$$

$$x_2 = x - r, \qquad (1)$$

where r, $\theta$ and $\phi$ are the polar coordinates of the vector $xx_1$.

The kinetic energy of the model, T, is defined as the summation of the kinetic energies of $$T = \frac{m}{2}(\dot{x}_1^2 + \dot{x}_2^2) \qquad (2)$$

$$= m\dot{x}^2 + m\dot{r}^2$$

$$= m(\dot{x}^2 + \dot{y}^2 + \dot{z}^2) + mr^2(\dot{\theta}^2 + \dot{\phi}^2 + \sin^2\theta).$$

the movements of $x_1$ and $x_2$:

Then, the equations for the motion of the submarine model are obtained by using $$\frac{d}{dt}\left(\frac{\partial T}{\partial \dot{q}_j}\right) - \frac{\partial T}{\partial q_j} = \sum_{i=1}^{2}\left(F_i \cdot \frac{\partial x_i}{\partial q_j}\right), \qquad (3)$$

LaGrange's equation:

where the $q_j$s are the generalized coordinates of the model and can be considered as the variables of time t as:

$$(q_1, q_2, q_3, q_4, q_5, q_6) = (x, y, z, \theta, \phi, \psi) = q(t), \qquad (4)$$

with $\psi$ denoting the roll angle of our camera system, which will be explained later. The $F_i$s are called the generalized forces. The control of the submarine is performed by applying a simulated external force to $x_1$, $$F_{ext} = (F_x, F_y, F_z),$$

and it is assumed that both $x_1$ and $x_2$ are affected by the forces from the potential field and the frictions which act in the opposite direction of each particle's velocity. Consequently, $$F_1 = -m\nabla V(x_1) - k\dot{x}_1 + F_{ext},$$

$$F_2 = -m\nabla V(x_2) - k\dot{x}_2, \qquad (5)$$

the generalized forces are formulated as follows:

where k denotes the friction coefficient of the system. The external force $F_{ext}$ is applied by the operator by simply clicking the mouse button in the desired direction 207 in the generated image, as shown in FIG. 2. This camera model would then be moved in that direction. This allows the operator to control at least five degrees of freedom of the camera with only a single click of the mouse button. From Equations (2), (3) and (5), it $$\ddot{x} = -\frac{1}{2}\left(\frac{\partial V(x_1)}{\partial x} + \frac{\partial V(x_2)}{\partial x}\right) - \frac{k\dot{x}}{m} + \frac{F_x}{2m}, \qquad (6)$$

-continued $$\ddot{y} = -\frac{1}{2}\left(\frac{\partial V(x_1)}{\partial y} + \frac{\partial V(x_2)}{\partial y}\right) - \frac{k\dot{y}}{m} + \frac{F_y}{2m},$$

$$\ddot{z} = -\frac{1}{2}\left(\frac{\partial V(x_1)}{\partial z} + \frac{\partial V(x_2)}{\partial z}\right) - \frac{k\dot{z}}{m} + \frac{F_z}{2m},$$

$$\ddot{\theta} = \dot{\phi}^2\sin\theta\cos\theta - \frac{1}{2r}\left[\cos\theta\left\{\cos\phi\left(\frac{\partial V(x_1)}{\partial x} - \frac{\partial V(x_2)}{\partial x}\right) + \sin\phi\left(\frac{\partial V(x_1)}{\partial y} - \frac{\partial V(x_2)}{\partial y}\right)\right\} - \sin\theta\left(\frac{\partial V(x_1)}{\partial z} - \frac{\partial V(x_2)}{\partial z}\right)\right] - \frac{k}{m}\dot{\theta} + \frac{1}{2mr}(F_x\cos\theta\cos\phi + F_y\cos\theta\sin\phi - F_z\sin\theta),$$

$$\ddot{\phi} = \frac{1}{\sin\theta}\left[-2\dot{\theta}\dot{\phi}\cos\theta - \frac{1}{2r}\left\{-\sin\phi\left(\frac{\partial V(x_1)}{\partial x} - \frac{\partial V(x_2)}{\partial x}\right) + \cos\phi\left(\frac{\partial V(x_1)}{\partial y} - \frac{\partial V(x_2)}{\partial y}\right)\right\} - \frac{k}{m}\dot{\phi}\sin\theta + \frac{1}{2mr}(-F_x\sin\phi + F_y\cos\phi)\right],$$

can be derived that the accelerations of the five parameters of our submarine model as: where x. and x.. denote the first and the second derivative of x, respectively, and $$\left(\frac{\partial V(x)}{\partial x}, \frac{\partial V(x)}{\partial y}, \frac{\partial V(x)}{\partial z}\right)$$

denotes the gradient of the potential at a point x. The terms $\phi.^2 \sin\theta\cos\theta$ of $\theta..$ and $$-\frac{2\dot{\theta}\dot{\phi}\ldots\cos\theta}{\sin\theta}$$

of $\phi..$ are called the centrifugal force and the Coriolis force, respectively, and they are concerned with the exchange of angular velocities of the submarine. Since the models does not have moment of inertia defined for the rod of the submarine, these terms tend to cause an overflow of the numeric calculation of $\phi$. Fortunately, these terms become significant only when the angular velocities of the submarine model are significant, which essentially means that the camera moves too fast. Since it is meaningless to allow the camera to move so fast because the organ could not be properly viewed, these terms are minimized in our implementation to avoid the overflow problem.

From the first three formulas of Equation (6), it is known that the submarine cannot be propelled by the external force against the potential field if the following condition is satisfied:

$$|\nabla V(x_1) + \nabla V(x_2)| > \frac{|F_{ext}|}{m}.$$

Since the velocity of the submarine and the external force $F_{ext}$ have upper limits in our implementation, by assigning sufficiently high potential values at the boundary of the objects, it can be guaranteed that the submarine never bumps against the objects or walls in the environment.

Figure 3:
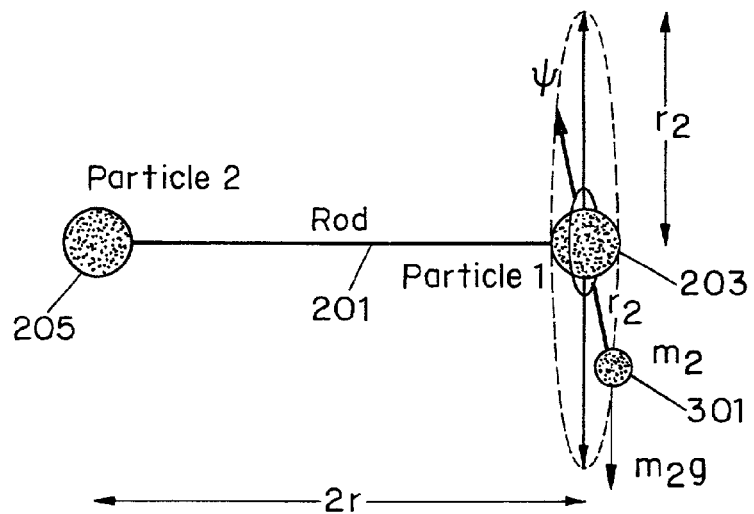
FIG. 3 is an illustration of a pendulum used to model pitch and roll of the "submarine" camera.

As mentioned previously, the roll angle $\psi$ of the camera system needs to be considered. One possible option allows the operator full control of the angle $\psi$. However, although the operator can rotate the camera freely around the rod of the model, he or she can easily become disoriented. The preferred technique assumes that the upper direction of the camera is connected to a pendulum with mass $m_2$ 301, which rotates freely around the rod of the submarine, as shown in FIG. 3. The direction of the pendulum, $r_2$, is expressed as:

$r_2 = r_2(\cos\theta \cos\phi \sin\psi + \sin\phi \cos\psi, \cos\theta \sin\phi \sin\psi - \cos\phi \cos\psi, -\sin\theta \sin\psi)$.

although it is possible to calculate the accurate movement of this pendulum along with the movement of the submarine, it makes the system equations too complicated.

Therefore, it is assumed that all the generalized coordinates except the roll angle $\psi$ are $$T_p = \frac{m_2}{2}\dot{r}_2^2 = \frac{m_2 r_2^2}{2}\dot{\psi}^2.$$

constants, and thus define the independent kinetic energy for the pendulum system as: This simplifies the model for the roll angle. Since it is assumed in this model that the $F_g = m_2 g = (m_2 g_x, m_2 g_y, m_2 g_z)$ gravitational force acts at the mass point $m_2$, the acceleration of $\psi$ can be derived using LaGrange's equation as:

$$\ddot{\psi} = \frac{1}{r_2}\{g_x(\cos\theta\cos\phi\cos\psi - \sin\phi\sin\psi) + g_y(\cos\theta\sin\phi\cos\psi + \cos\phi\sin\psi) + g_z(-\sin\theta\cos\psi)\} - \frac{k_2}{m_2}\dot{\psi}. \quad (7)$$

From Equations (6) and (7), the generalized coordinates q(t) and their derivatives q(t) are calculated asymptotically by using Taylor series as:

$$q(t+h) = q(t) + h\dot{q}(t) + \frac{h^2}{2}\ddot{q}(t) + O(h^3),$$

$$\dot{q}(t+h) = \dot{q}(t) + h\ddot{q}(t) + O(h^2),$$

to freely move the submarine. To smooth the submarine's motion, the time step h is selected as an equilibrium value between being as small as possible to smooth the motion but as large as necessary to reduce computation cost.

Definition of the Potential Field

The potential field in the submarine model in FIG. 2 defines the boundaries (walls or other matter) in the virtual organ by assigning a high potential to the boundary in order to ensure that the submarine camera does not collide with the walls or other boundary. If the camera model is attempted to be moved into a high potential area by the operator, the camera model will be restrained from doing so unless the operator wishes to examine the organ behind the boundary or inside a polyp, for example. In the case of performing a virtual colonoscopy, a potential field value is assigned to each piece of volumetric colon data (volume element). When a particular region of interest is designated in step 105 of FIG. 1 with a start and finish point, the voxels within the selected area of the scanned colon are identified using conventional blocking operations. Subsequently, a potential value is assigned to every voxel x of the selected volume based on the following three distance values: the distance from the finishing point dt(x), the distance from the colon surface ds(x) and the distance from the center-line of the colon space dc(x). dt(x) is calculated by using a conventional growing strategy. The distance from the colon surface, ds(x), is computed using a conventional technique of growing from the surface voxels inwards. To determine dc(x), the center-line of the colon from the voxel is first extracted, and then dc(x) is computed using the conventional growing strategy from the center-line of the colon.

To calculate the center-line of the selected colon area defined by the user-specified start point and the user-specified finish point, the maximum value of ds(x) is located and denoted dmax. Then for each voxel inside the area of interest, a cost value of dmax-ds(x) is assigned. Thus the voxels which are close to the colon surface have high cost values and the voxels close to the center line have relatively low cost values. Then, based on the cost assignment, the single-source shortest path technique which is well known in the art is applied to efficiently compute a minimum cost path from the source point to the finish point. This low cost line indicates the center-line or skeleton of the colon section which is desired to be explored. This technique for determining the center-line is the preferred technique of the invention.

To compute the potential value V(x) for a voxel x inside the area of interest, the following formula is employed:

$$V(x) = C_1 d_t(x)^\mu + C_2 \left( \frac{d_s(x)}{d_c(x) + d_s(x)} \right)^{-\nu}, \quad (8)$$

where $C_1$, $C_2$, $\mu$ and $\nu$ are constants chosen for the task. In order to avoid any collision between the virtual camera and the virtual colonic surface, a sufficiently large potential value is assigned for all points outside the colon. The gradient of the potential field will therefore become so significant that the submarine model camera will never collide with the colonic wall when being run.

Another technique to determine the center-line of the path in the colon is called the "peel-layer" technique and is shown in FIG. 4 through FIG. 8.

FIG. 4 shows a 2D cross-section of the volumetric colon, with the two side walls 401 and 403 of the colon being shown. Two blocking walls are selected by the operator in order to define the section of the colon which is of interest to examine. Nothing can be viewed beyond the blocking walls. This helps reduce the number of computations when displaying the virtual representation. The blocking walls together with side walls identify a contained volumetric shape of the colon which is to be explored.

FIG. 5 shows two end points of the flight path of the virtual examination, the start volume element 501 and the finish volume element 503. The start and finish points are selected by the operator in step 105 of FIG. 1. The voxels between the start and finish points and the colon sides are identified and marked, as indicated by the area designated with "x"s in FIG. 6. The voxels are three-dimensional representations of the picture element.

The peel-layer technique is then applied to the identified and marked voxels in FIG. 6. The outermost layer of all the voxels (closest to the colon walls) is peeled off step-by-step, until there is only one inner layer of voxels remaining. Stated differently, each voxel furthest away from a center point is removed if the removal does not lead to a disconnection of the path between the start voxel and the finish voxel. FIG. 7 shows the intermediate result after a number of iterations of peeling the voxels in the virtual colon are complete. The voxels closest to the walls of the colon have been removed. FIG. 8 shows the final flight path for the camera model down the center of the colon after all the peeling iterations are complete. This produces essentially a skeleton at the center of the colon and becomes the desired flight path for the camera model.

Z-Buffer Assisted Visibility

FIG. 9 describes a real time visibility technique to display of virtual images seen by the camera model in the virtual three-dimensional volume representation of an organ. FIG. 9 shows a display technique using a modified Z buffer which corresponds to step 109 in FIG. 1. The number of voxels which could be possibly viewed from the camera model is extremely large. Unless the total number of elements (or polygons) which must be computed and visualized is reduced from an entire set of voxels in the scanned environment, the overall number of computations will make the visualization display process exceedingly slow for a large internal area. However, in the present invention only those images which are visible on the colon surface need to be computed for display. The scanned environment can be subdivided into smaller sections, or cells. The Z buffer technique then renders only a portion of the cells which are visible from the camera. The Z buffer technique is also used for three-dimensional voxel representations. The use of a modified Z buffer reduces the number of visible voxels to be computed and allows for the real time examination of the virtual colon by a physician or medical technician.

Figure 10:
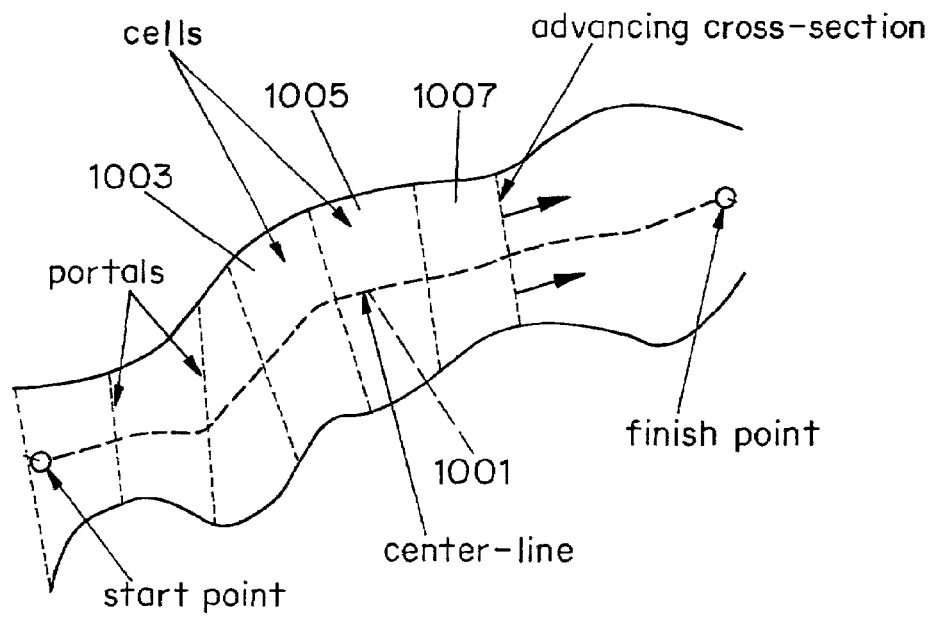
FIG. 10 is an illustration of a virtual colon which has been sub-divided into cells.

The area of interest from which the center-line has been calculated in step 107 is subdivided into cells before the display technique is applied. Cells are collective groups of voxels which become a visibility unit. The voxels in each cell will be displayed as a group. Each cell contains a number of portals through which the other cells can be viewed. The colon is subdivided by beginning at the selected start point and moving along the center-line 1001 towards the finish point. The colon is then partitioned into cells (for example, cells 1003, 1005 and 1007 in FIG. 10) when a predefined threshold distance along the center-path is reached. The threshold distance is based upon the specifications of the platform upon which the visualization technique is performed and its capabilities of storage and processing. The cell size is directly related to the number of voxels which can be stored and processed by the platform. One example of a threshold distance is 5 cm, although the distance can greatly vary. Each cell has two cross-sections as portals for viewing outside of the cell as shown in FIG. 10.

Step 901 in FIG. 9 identifies the cell within the selected organ which currently contains the camera. The current cell will be displayed as well as all other cells which are visible given the orientation of the camera. Step 903 builds a stab tree (tree diagram) of hierarchical data of potentially visible cells from the camera (through defined portals), as will be described in further detail hereinbelow. The stab tree contains a node for every cell which may be visible to the camera. Some of the cells may be transparent without any blocking bodies present so that more than one cell will be visible in a single direction. Step 905 stores a subset of the voxels from a cell which include the intersection of adjoining cell edges and stores them at the outside edge of the stab tree in order to more efficiently determine which cells are visible.

Step 907 checks if any loop nodes are present in the stab tree. A loop node occurs when two or more edges of a single cell both border on the same nearby cell. This may occur when a single cell is surrounded by another cell. If a loop node is identified in the stab tree, the method continues with step 909. If there is no loop node, the process goes to step 911.

Step 909 collapses the two cells making up the loop node into one large node. The stab tree is then corrected accordingly. This eliminates the problem of viewing the same cell twice because of a loop node. The step is performed on all identified loop nodes. The process then continues with step 911.

Step 911 then initiates the Z-buffer with the largest Z value. The Z value defines the distance away from the camera along the skeleton path. The tree is then traversed to first check the intersection values at each node. If a node intersection is covered, meaning that the current portal sequence is occluded (which is determined by the Z buffer test), then the traversal of the current branch in the tree is stopped. Step 913 traverses each of the branches to check if the nodes are covered and displays them if they are not.

Step 915 then constructs the image to be displayed on the operator's screen from the volume elements within the visible cells identified in step 913 using one of a variety of techniques known in the art, such as volume rendering by compositing. The only cells shown are those which are identified as potentially visible. This technique limits the number of cells which requires calculations in order to achieve a real time display and correspondingly increases the speed of the display for better performance. This technique is an improvement over prior techniques which calculate all the possible visible data points whether or not they are actually viewed.

Figure 11A:
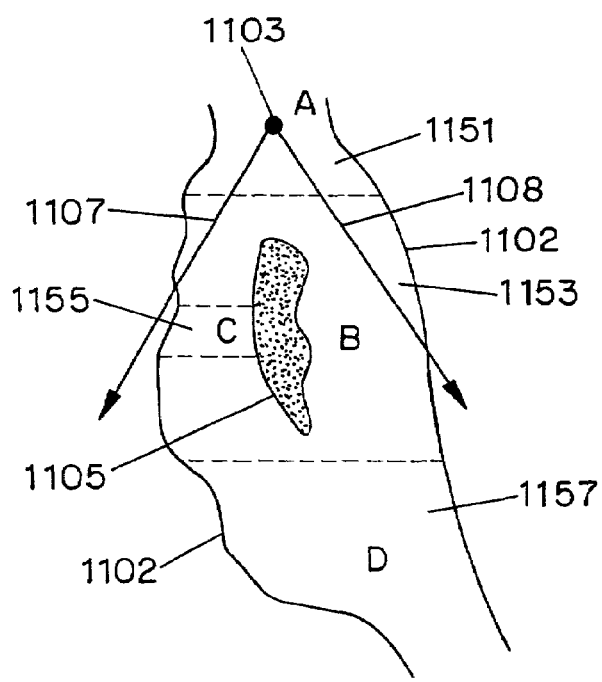
FIG. 11A is a graphical depiction of an organ which is being virtually examined.

FIG. 11A is a two dimensional pictorial representation of an organ which is being explored by guided navigation and needs to be displayed to an operator. Organ 1101 shows two side walls 1102 and an object 1105 in the center of the pathway. The organ has been divided into four cells A 1151, B 1153, C 1155 and D 1157. The camera 1103 is facing towards cell D 1157 and has a field of vision defined by vision vectors 1107, 1108 which can identify a cone-shaped field. The cells which can be potentially viewed are cells B 1153, C 1155 and D 1157. Cell C 1155 is completely surrounded by Cell B and thus constitutes a node loop.

Figure 11B:
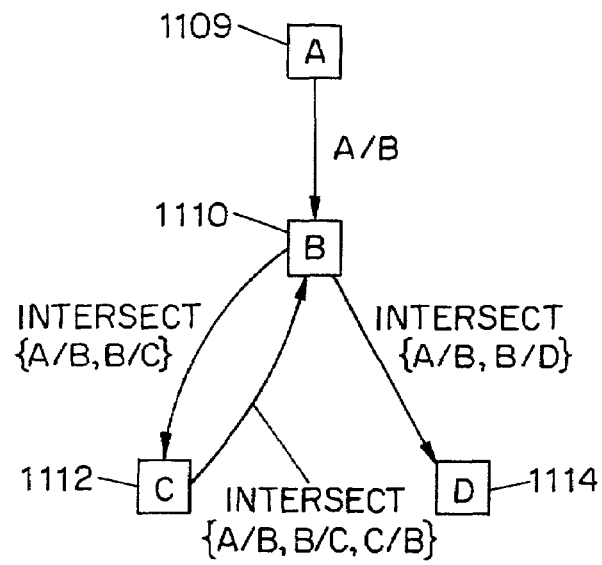
FIG. 11B is a graphical depiction of a stab tree generated when depicting the organ in FIG. 11A.

FIG. 11B is a representation of a stab tree built from the cells in FIG. 11A. Node A 1109 which contains the camera is at the root of the tree. A sight line or sight cone, which is a visible path without being blocked, is drawn to node B 1110. Node B has direct visible sight lines to both node C 1112 and node D 1114 and which is shown by the connecting arrows. The sight line of node C 1112 in the direction of the viewing camera combines with node B 1110. Node C 1112 and node B 1110 will thus be collapsed into one large node B' 1122 as shown in FIG. 11C.

Figure 11C:
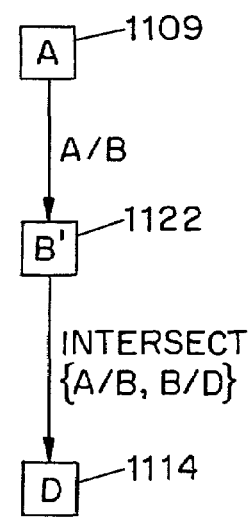
FIG. 11C is a further graphical depiction of a stab tree generated while depicting the organ in FIG. 11A.

FIG. 11C shows node A 1109 containing the camera adjacent to node B' 1122 (containing both nodes B and node C) and node D 1114. The nodes A, B' and D will be displayed at least partially to the operator.

Figure 12A:
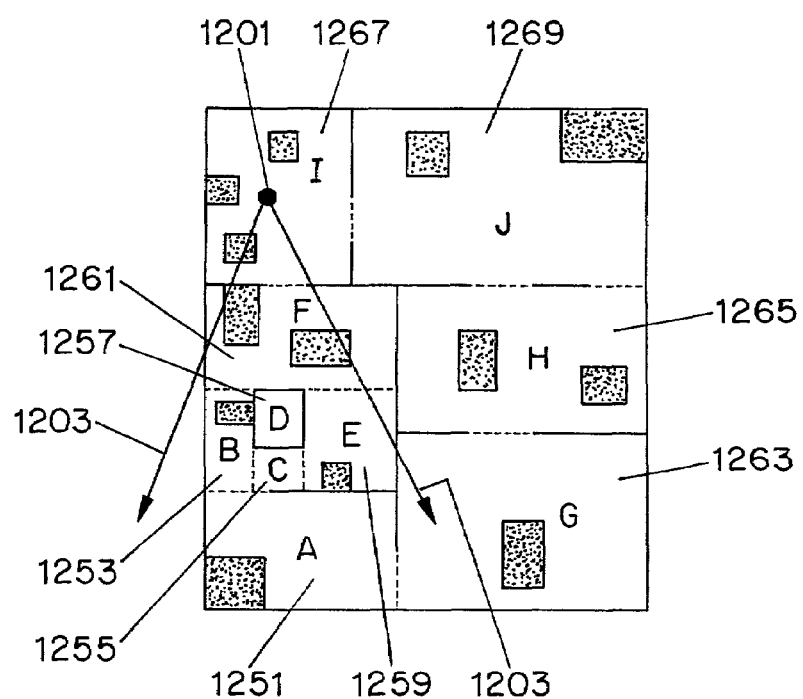
FIG. 12A is a graphical depiction of a scene to be rendered with objects within certain cells of the scene.
Figure 12B:
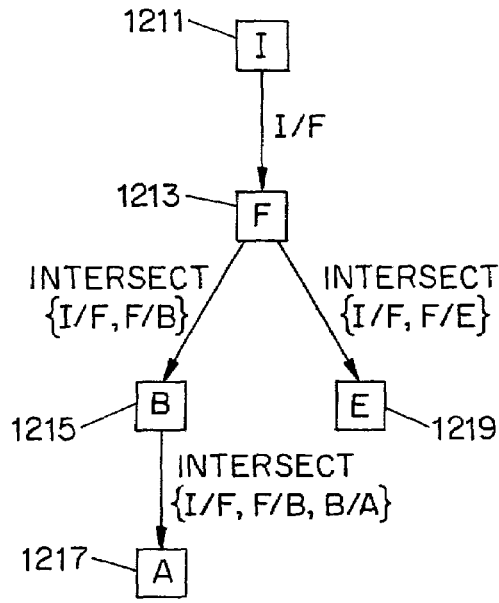
FIG. 12B is a graphical depiction of a stab tree generated while depicting the scene in FIG. 12A.

FIGS. 12A–12E illustrate the use of the modified Z buffer with cells that contain objects which obstruct the views. An object could be some waste material in a portion of the virtual colon. FIG. 12A shows a virtual space with 10 potential cells: A 1251, B 1253, C 1255, D 1257, E 1259, F 1261, G 1263, H 1265, I 1267 and J 1269. Some of the cells contain objects. If the camera 1201 is positioned in cell I 1267 and is facing toward cell F 1261 as indicated by the vision vectors 1203, then a stab tree is generated in accordance with the technique illustrated by the flow diagram in FIG. 9. FIG. 12B shows the stab tree generated with the intersection nodes showing for the virtual representation as shown in FIG. 12A. FIG. 12B shows cell I 1267 as the root node of the tree because it contains the camera 1201. Node I 1211 is pointing to node F 1213 (as indicated with an arrow), because cell F is directly connected to the sight line of the camera. Node F 1213 is pointing to both node B 1215 and node E 1219. Node B 1215 is pointing to node A 1217. Node C 1202 is completely blocked from the line of sight by camera 1201 so is not included in the stab tree.

Figure 12C:
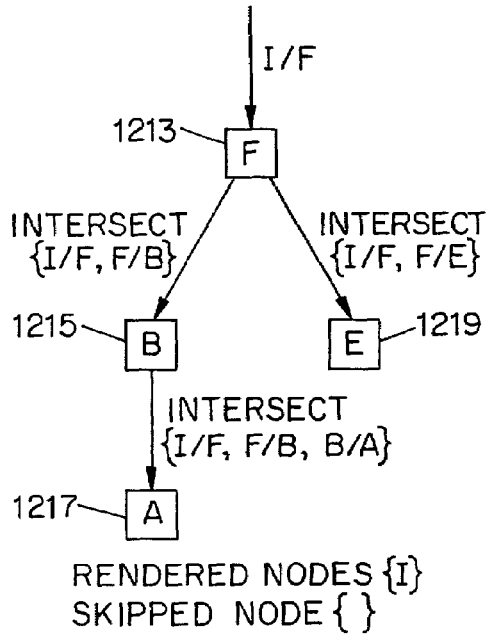
FIGS. 12C–12E are further graphical depictions of stab trees generated while depicting the image in FIG. 12A.
Figure 12D:
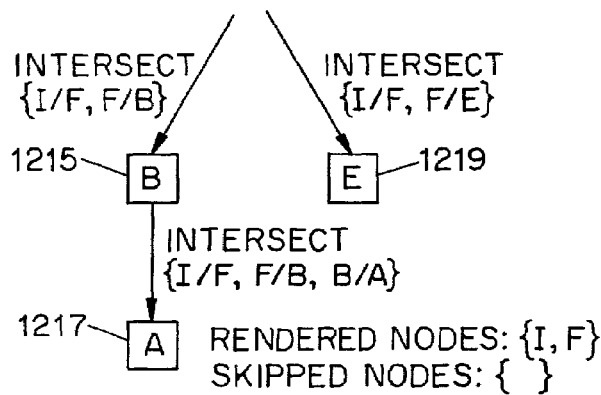

FIG. 12C shows the stab tree after node I 1211 is rendered on the display for the operator. Node I 1211 is then removed from the stab tree because it has already been displayed and node F 1213 becomes the root. FIG. 12D shows that node F 1213 is now rendered to join node I 1211. The next nodes in the tree connected by arrows are then checked to see if they are already covered (already processed). In this example, all of the intersected nodes from the camera positioned in cell I 1267 has been covered so that node B 515 (and therefore dependent node A) do not need to be rendered on the display.

Figure 12E:
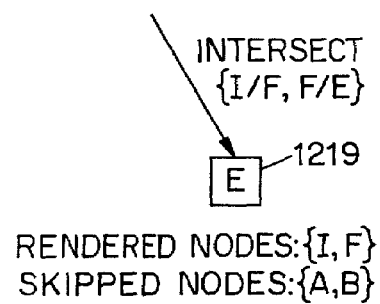

FIG. 12E shows node E 515 being checked to determine if its intersection has been covered. Since it has, the only rendered nodes in this example of FIGS. 12A–12E are nodes I and F while nodes A, B and E are not visible and do not need to have their cells prepared to be displayed.

The modified Z buffer technique described in FIG. 9 allows for fewer computations and can be applied to an object which has been represented by voxels or other data elements, such as polygons.

Figure 13:
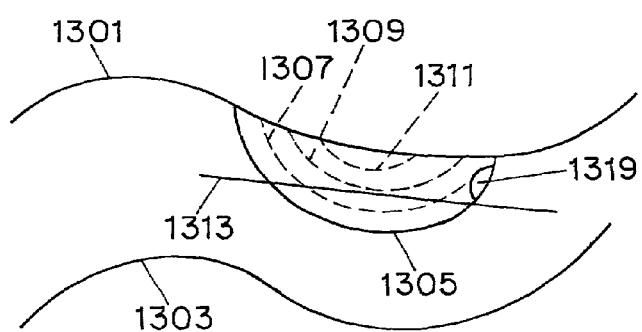
FIG. 13 is a two dimensional representation of a virtual colon containing a polyp whose layers can be removed.

FIG. 13 shows a two dimensional virtual view of a colon with a large polyp present along one of its walls. FIG. 13 shows a selected section of a patient's colon which is to be examined further. The view shows two colon walls 1301 and 1303 with the growth indicated as 1305. Layers 1307, 1309, and 1311 show inner layers of the growth. It is desirable for a physician to be able to peel the layers of the polyp or tumor away to look inside of the mass for any cancerous or other harmful material. This process would in effect perform a virtual biopsy of the mass without actually cutting into the mass. Once the colon is represented virtually by voxels, the process of peeling away layers of an object is easily performed in a similar manner as described in conjunction with FIGS. 4 through 8. The mass can also be sliced so that a particular cross-section can be examined. In FIG. 13, a planar cut 1313 can be made so that a particular portion of the growth can be examined. Additionally, a user-defined slice 1319 can be made in any manner in the growth. The voxels 1319 can either be peeled away or modified as explained below.

A transfer function can be performed to each voxel in the area of interest which can make the object transparent, semi-transparent or opaque by altering coefficients representing the translucently for each voxel. An opacity coefficient is assigned to each voxel based on its density. A mapping function then transforms the density value to a coefficient representing its translucency. A high density scanned voxel will indicate either a wall or other dense matter besides simply open space. An operator or program routine could then change the opacity coefficient of a voxel or group of voxels to make them appear transparent or semi-transparent to the submarine camera model. For example, an operator may view a tumor within or outside of an entire growth. Or a transparent voxel will be made to appear as if it is not present for the display step of FIG. 9. A composite of a section of the object can be created using a weighted average of the opacity coefficients of the voxels in that section.

If a physician desires to view the various layers of a polyp to look for a cancerous areas, this can be performed by removing the outer layer of polyp 1305 yielding a first layer 1307. Additionally, the first inner layer 1307 can be stripped back to view second inner layer 1309. The second inner layer can be stripped back to view third inner layer 1311, etc. The physician could also slice the polyp 1305 and view only those voxels within a desired section. The slicing area can be completely user-defined.

Adding an opacity coefficient can also be used in other ways to aid in the exploration of a virtual system. If waste material is present and has a density as other properties within a certain known range, the waste can be made transparent to the virtual camera by changing its opacity coefficient during the examination. This will allow the patient to avoid ingesting a bowel cleansing agent before the procedure and make the examination faster and easier. Other objects can be similarly made to disappear depending upon the actual application. Additionally, some objects like polyps could be enhanced electronically by a contrast agent followed by a use of an appropriate transfer function.

Figure 14:
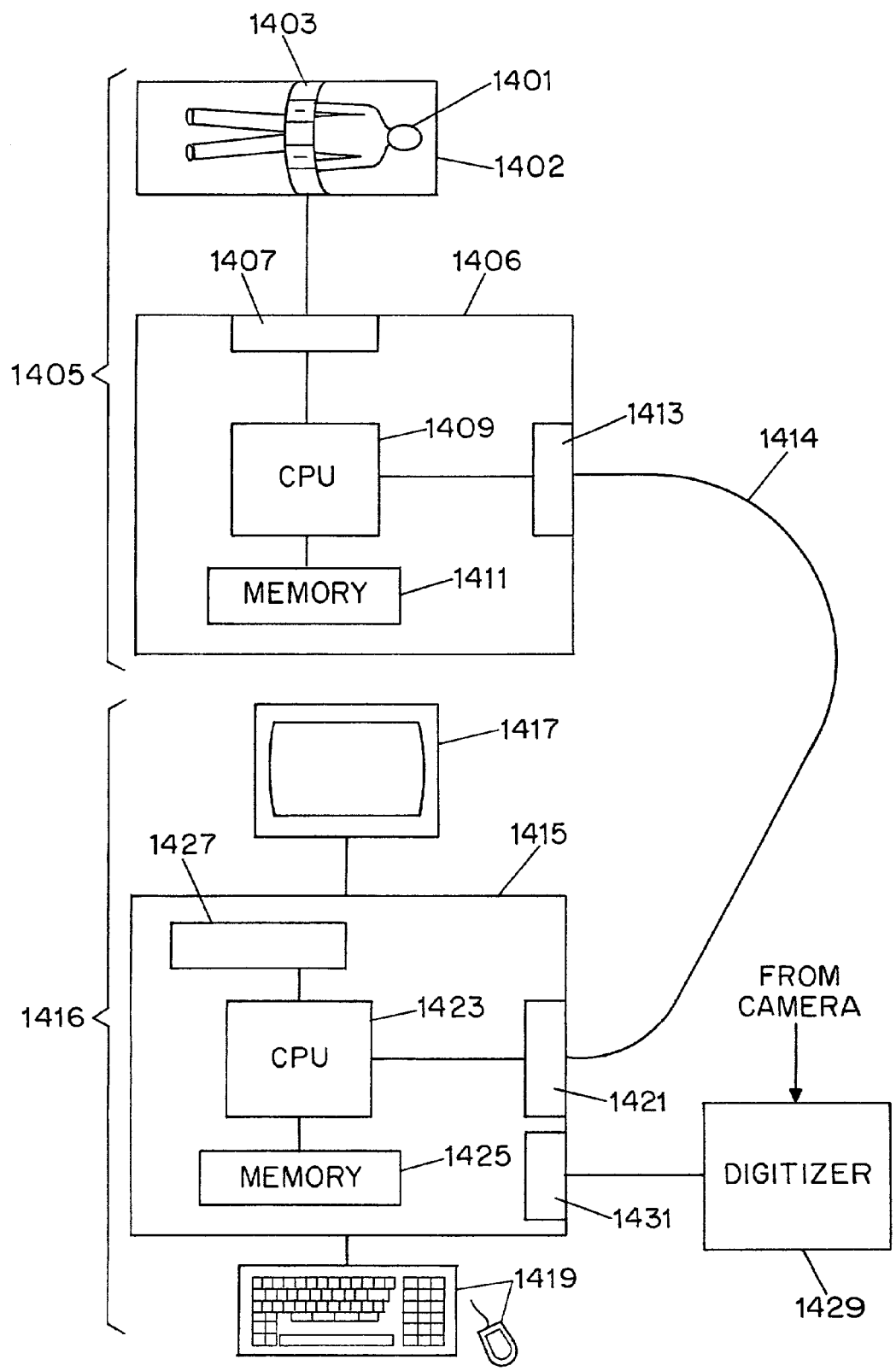
FIG. 14 is a diagram of a system used to perform a virtual examination of a human organ in accordance with the invention.

FIG. 14 shows a system for performing the virtual examination of an object such as a human organ using the techniques described in this specification. Patient 1401 lies down on a platform 1402 while scanning device 1405 scans the area that contains the organ or organs which are to be examined. The scanning device 1405 contains a scanning portion 1403 which actually takes images of the patient and an electronics portion 1406. Electronics portion 1406 comprises an interface 1407, a central processing unit 1409, a memory 1411 for temporarily storing the scanning data, and a second interface 1413 for sending data to the virtual navigation platform. Interface 1407 and 1413 could be included in a single interface component or could be the same component. The components in portion 1406 are connected together with conventional connectors.

In system 1400, the data provided from the scanning portion of device 1403 is transferred to portion 1405 for processing and is stored in memory 1411. Central processing unit 1409 converts the scanned 2D data to 3D voxel data and stores the results in another portion of memory 1411. Alternatively, the converted data could be directly sent to interface unit 1413 to be transferred to the virtual navigation terminal 1416. The conversion of the 2D data could also take place at the virtual navigation terminal 1416 after being transmitted from interface 1413. In the preferred embodiment, the converted data is transmitted over carrier 1414 to the virtual navigation terminal 1416 in order for an operator to perform the virtual examination. The data could also be transported in other conventional ways such as storing the data on a storage medium and physically transporting it to terminal 1416 or by using satellite transmissions.

The scanned data may not be converted to its 3D representation until the visualization rendering engine requires it to be in 3D form. This saves computational steps and memory storage space.

Virtual navigation terminal 1416 includes a screen for viewing the virtual organ or other scanned image, an electronics portion 1415 and interface control 1419 such as a keyboard, mouse or spaceball. Electronics portion 1415 comprises a interface port 1421, a central processing unit 1423, other components 1427 necessary to run the terminal and a memory 1425. The components in terminal 1416 are connected together with conventional connectors. The converted voxel data is received in interface port 1421 and stored in memory 1425. The central processor unit 1423 then assembles the 3D voxels into a virtual representation and runs the submarine camera model as described in FIGS. 2 and 3 to perform the virtual examination. As the submarine camera travels through the virtual organ, the visibility technique as described in FIG. 9 is used to compute only those areas which are visible from the virtual camera and displays them on screen 1417. A graphics accelerator can also be used in generating the representations. The operator can use interface device 1419 to indicate which portion of the scanned body is desired to be explored. The interface device 1419 can further be used to control and move the submarine camera as desired as discussed in FIG. 2 and its accompanying description. Terminal portion 1415 can be the Cube-4 dedicated system box, generally available from the Department of Computer Science at the State University of New York at Stony Brook.

Scanning device 1405 and terminal 1416, or parts thereof, can be part of the same unit. A single platform would be used to receive the scan image data, connect it to 3D voxels if necessary and perform the guided navigation.

An important feature in system 1400 is that the virtual organ can be examined at a later time without the presence of the patient. Additionally, the virtual examination could take place while the patient is being scanned. The scan data can also be sent to multiple terminals which would allow more than one doctor to view the inside of the organ simultaneously. Thus a doctor in New York could be looking at the same portion of a patient's organ at the same time with a doctor in California while discussing the case. Alternatively, the data can be viewed at different times. Two or more doctors could perform their own examination of the same data in a difficult case. Multiple virtual navigation terminals could be used to view the same scan data. By reproducing the organ as a virtual organ with a discrete set of data, there are a multitude of benefits in areas such as accuracy, cost and possible data manipulations.

The above described techniques can be further enhanced in virtual colonoscopy applications through the use of an improved electronic colon cleansing technique which employs modified bowel preparation operations followed by image segmentation operations, such that fluid and stool remaining in the colon during a computed tomographic (CT) or magnetic resonance imaging (MRI) scan can be detected and removed from the virtual colonoscopy images. Through the use of such techniques, conventional physical washing of the colon, and its associated inconvenience and discomfort, is minimized or completely avoided.

Figure 15:
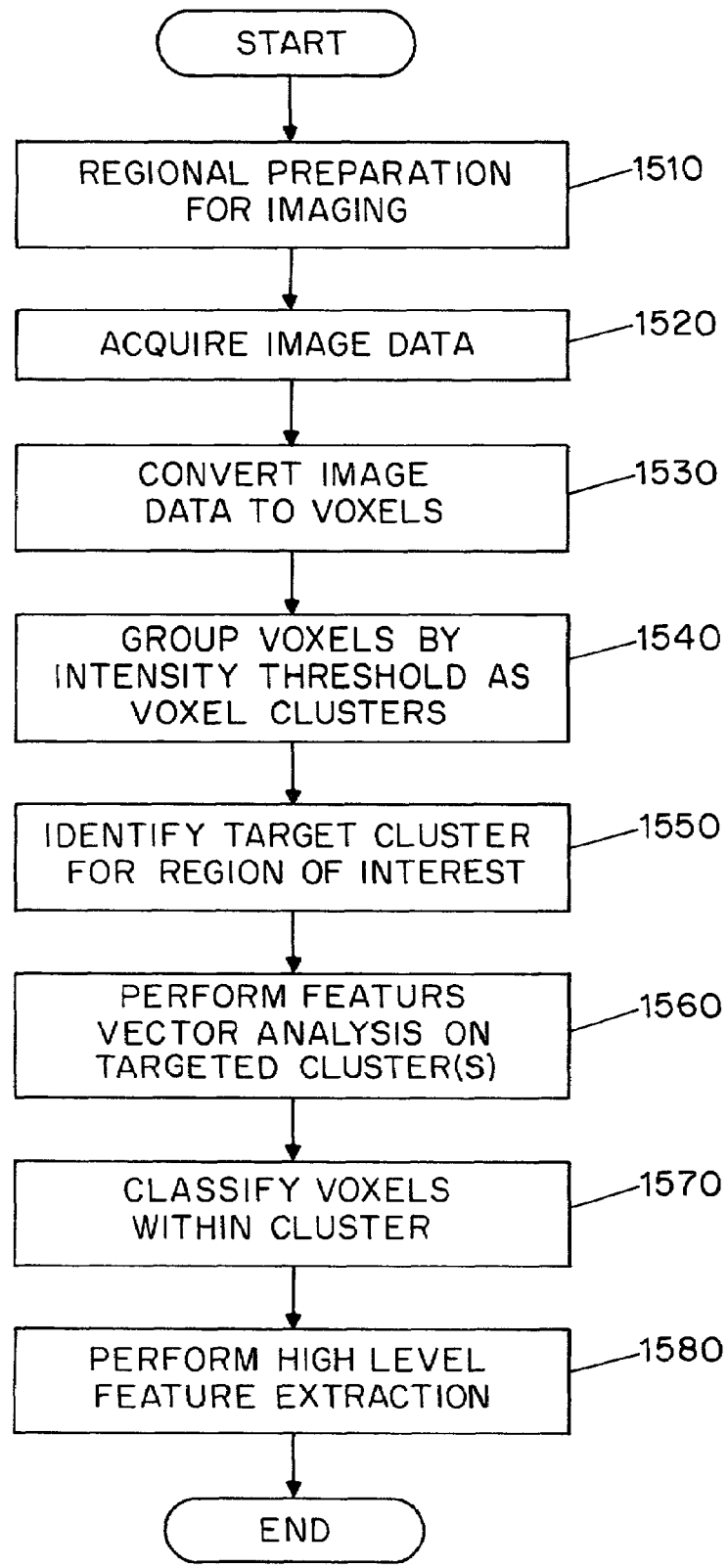
FIG. 15 is a flow chart depicting an improved image segmentation method.

Referring to FIG. 15, the first step in electronic colon cleansing is bowel preparation (step 1510), which takes place prior to conducting the CT or magnetic resonance imaging (MRI) scan and is intended to create a condition where residual stool and fluid remaining in the colon present significantly different image properties from that of the gas-filled colon interior and colon wall. An exemplary bowel preparation operation includes ingesting three 250 cc doses of Barium Sulfate suspension of 2.1% W/V, such as manufactured by E-Z-EM, Inc.,of Westbury, N.Y., during the day prior the CT or MRI scan. The three doses should be spread out over the course of the day and can be ingested along with three meals, respectively. The Barium Sulfate serves to enhance the images of any stool which remains in the colon. In addition to the intake of Barium Sulfate, fluid intake is preferably increased during the day prior to the CT or MRI scan. Cranberry juice is known to provide increased bowel fluids and is preferred, although water can also be ingested. In both the evening prior to the CT scan and the morning of the CT scan, 60 ml of a Diatrizoate Meglumine and Diaztrizoate Sodium Solution, which is commercially available as MD-Gastroview, manufactured by Mallinckrodt, Inc. of St. Louis, Mo., can be consumed to enhance image properties of the colonic fluid. Sodium phosphate can also be added to the solution to liquilize the stool in the colon, which provides for more uniform enhancement of the colonic fluid and residual stool.

The above described exemplary preliminary bowel preparation operation can obviate the need for conventional colonic washing protocols, which can call for the ingestion of a gallon of Golytely solution prior to a CT scan.

Just prior to conducting the CT scan, an intravenous injection of 1 ml of Glucagon, manufactured by Ely Lily and Company, of Indianapolis, Ind. can be administered to minimize colon collapse. Then, the colon can be inflated using approximately 1000 cc of compressed gas, such as $CO_2$, or room air, which can be introduced through a rectum tube. At this point, a conventional CT scan is performed to acquire data from the region of the colon (step 1520). For example, data can be acquired using a GE/CTI spiral mode scanner operating in a helical mode of 5 mm , 1.5–2.0:1 pitch, where the pitch is adjusted based upon the patient's height in a known manner. A routine imaging protocol of 120 kVp and 200–280 ma can be utilized for this operation. The data can be acquired and reconstructed as 1 mm thick slice images having an array size of 512×512 pixels in the field of view, which varies from 34 to 40 cm depending on the patient's size. the number of such slices generally varies under these conditions from 300 to 450, depending on the patient's height. The image data set is converted to volume elements or voxels (step 1530).

Image segmentation can be performed in a number of ways. In one present method of image segmentation, a local neighbor technique is used to classify voxels of the image data in accordance with similar intensity values. In this method, each voxel of an acquired image is evaluated with respect to a group of neighbor voxels. The voxel of interest is referred to as the central voxel and has an associated intensity value. A classification indicator for each voxel is established by comparing the value of the central voxel to each of its neighbors. If the neighbor has the same value as the central voxel, the value of the classification indicator is incremented. However, if the neighbor has a different value from the central voxel, the classification indicator for the central voxel is decremented. The central voxel is then classified to that category which has the maximum indicator value, which indicates the most uniform neighborhood among the local neighbors. Each classification is indicative of a particular intensity range, which in turn is representative of one or more material types being imaged. The method can be further enhanced by employing a mixture probability function to the similarity classifications derived.

Figure 16:
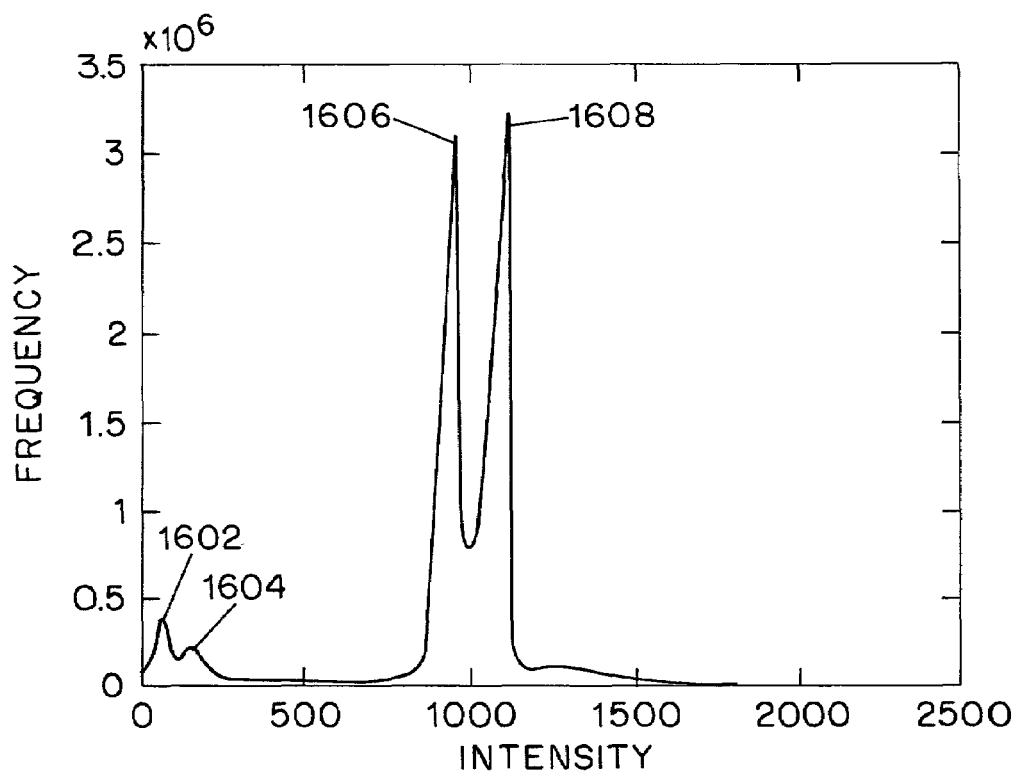
FIG. 16 is a graph of voxel intensity versus frequency of a typical abdominal CT data set.

An alternate process of image segmentation is performed as two major operations: low level processing and high level feature extraction. During low level processing, regions outside the body contour are eliminated from further processing and voxels within the body contour are roughly categorized in accordance with well defined classes of intensity characteristics. For example, a CT scan of the abdominal region generates a data set which tends to exhibit a well defined intensity distribution. The graph of FIG. 16 illustrates such an intensity distribution as an exemplary histogram having four, well defined peaks, 1602, 1604, 1606, 1608, which can be classified according to intensity thresholds.

The voxels of the abdominal CT data set are roughly classified as four clusters by intensity thresholds (step 1540). For example, Cluster 1 can include voxels whose intensities are below 140. This cluster generally corresponds to the lowest density regions within the interior of the gas filled colon. Cluster 2 can include voxels which have intensity values in excess of 2200. These intensity values correspond to the enhanced stool and fluid within the colon as well as bone. Cluster 3 can include voxels with intensities in the range of about 900 to about 1080. This intensity range generally represents soft tissues, such as fat and muscle, which are unlikely to be associated with the colon. The remaining voxels can then be grouped together as cluster 4, which are likely to be associated with the colon wall (including mucosa and partial volume mixtures around the colon wall) as well as lung tissue and soft bones.

Clusters 1 and 3 are not particularly valuable in identifying the colon wall and, therefore are not subject to substantial processing during image segmentation procedures for virtual colonoscopy. The voxels associated with cluster 2 are important for segregating stool and fluid from the colon wall and are processed further during the high-level feature extraction operations. Low level processing is concentrated on the fourth cluster, which has the highest likelihood of corresponding to colon tissue (step 1550).

Figure 17:
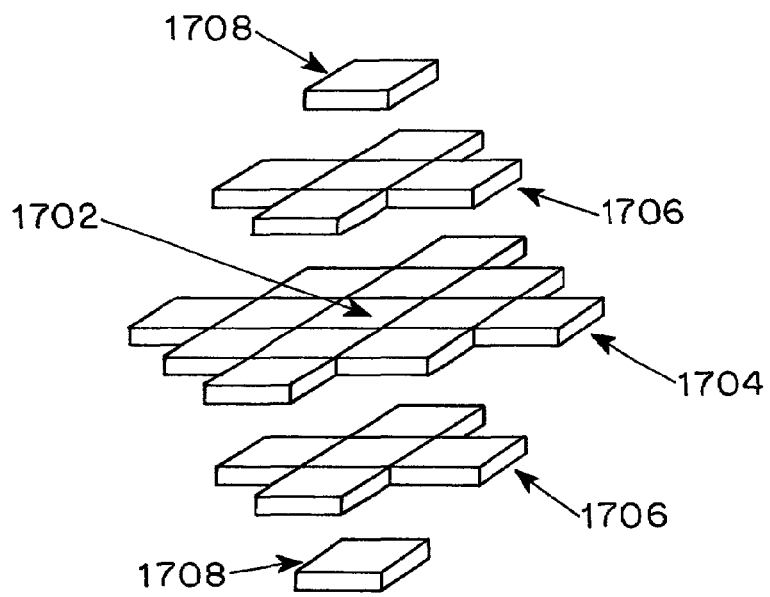
FIG. 17 is a perspective view diagram of an intensity vector structure including a voxel of interest and its selected neighbors.

For each voxel in the fourth cluster, an intensity vector is generated using itself and its neighbors. The intensity vector provides an indication of the change in intensity in the neighborhood proximate a given voxel. The number of neighbor voxels which are used to establish the intensity vector is not critical, but involves a tradeoff between processing overhead and accuracy. For example, a simple voxel intensity vector can be established with seven (7) voxels, which includes the voxel of interest, its front and back neighbors, its left and right neighbors and its top and bottom neighbors, all surrounding the voxel of interest on three mutually perpendicular axes. FIG. 17 is a perspective view illustrating an exemplary intensity vector in the form of a 25 voxel intensity vector model, which includes the selected voxel 1702 as well as its first, second and third order neighbors. The selected voxel 1702 is the central point of this model and is referred to as the fixed voxel. A planar slice of voxels, which includes 12 neighbors on the same plane as the fixed voxel, is referred to as the fixed slice 1704. On adjacent planes to the fixed slice are two nearest slices 1706, having five voxels each. Adjacent to the first nearest slices 1706 are two second nearest slices 1708, each having a single voxel. The collection of intensity vectors for each voxel in the fourth cluster is referred to as a local vector series.

Because the data set for an abdominal image generally includes more than 300 slice images, each with a 512×512 voxel array, and each voxel having an associated 25 voxel local vector, it is desirable to perform feature analysis (step 1570) on the local vector series to reduce the computational burden. One such feature analysis is a principal component analysis (PCA), which can be applied to the local vector series to determine the dimension of a feature vector series and an orthogonal transformation matrix for the voxels of cluster 4.

It has been found that the histogram (FIG. 16) of the CT image intensities tends to be fairly constant from patient to patient for a particular scanner, given equivalent preparation and scanning parameters. Relying on this observation, an orthogonal transformation matrix can be established which is a predetermined matrix determined by using several sets of training data acquired using the same scanner under similar conditions. From this data, a transformation matrix, such as a Karlhunen-Loéve (K-L) transformation, can be generated in a known manner. The transformation matrix is applied to the local vector series to generate feature vector series. Once in the feature-vector space domain, vector quantization techniques can be used to classify the feature vector series.

An analytical, self-adaptive algorithm can be used for the classification of the feature vectors. In defining this algorithm, let $\{X_i \epsilon R^4 : i=1, 2, 3, \ldots, N\}$ be the series of the feature vectors, where N is the number of feature vectors; K denotes the maximum number of classes; and T is a threshold which is adaptive to the data set. For each class, a representative element is generated by the algorithm. Let $a_k$ be a representative element of class k and $n_k$ be the number of feature vectors in that class.

The algorithm can then be outlined as:
1. Set $n_1=1$; $a_1=X_1$; $\overline{K}=1$;
2. obtain the class number $\overline{K}$ and class parameters ($a_k$, $n_k$)

```
        for (i=1; i<N; i++)
            for (j = 1; j < K; j++)
                calculate d_j = dist(X_i, a_j);
            end for
            index=arc min d_j;
            if ((d_index < T)^j or (K = K))
                update class parameters:

a_index = ──────────── x(n_index_a_index + X_i);
          n_index + 1 n_index = n_index + 1;
            end if
            else
                                              generate new
class
                a_{k_+1} = X_i;
                n_{k_+1} = 1
                K = K + 1;
            end else
        end for
```

3. label each feature vector to a class according to the nearest neighbor rule

```
        for (i=1;i<N;i++)
            for (j=1;j<K;j++)
                calculate d_j=dist(X_i,a_j);
            end for
            index=arc min d_j;
            label voxel i to class index.
        end for
```

In this algorithm, dist(x,y) is the Euclidean distance between vector x and y and arc min $d_j$ gives the integer j which realizes the minimum value of $d_j$.

The above described algorithm is dependent only on the parameters T and K. However, the value of K, which relates to the number of classes within each voxel cluster, is not critical and can be set to a constant value, such as K=18. However, T, which is the vector similarity threshold, greatly influences the classification results. If the selected value of T is too large, only a single class will be generated. On the other hand, if the value of T is too small, the resulting classes will exhibit undesirable redundancy. By setting the value of T to be equal to the maximum component variance of the feature vector series, the maximum number of distinct classes results.

As a result of the initial classification process, each voxel within the selected cluster is assigned to a class (step 1570). In the exemplary case of virtual colonoscopy, there are several classes within cluster 4. Thus, the next task is to determine which of the several classes in cluster 4 corresponds to the colon wall. The first coordinate of the feature vector, which is that coordinate of the feature vector exhibiting the highest variance, reflects the information of the average of the 3D local voxel intensities. The remaining coordinates of the feature vector contain the information of directional intensity change within the local neighbors. Because the colon wall voxels for the interior of the colon are generally in close proximity to the gas voxels of cluster 1, a threshold interval can be determined by data samples selected from typical colon wall intensities of a typical CT data set to roughly distinguish colon wall voxel candidates. The particular threshold value is selected for each particular imaging protocol and device. This threshold interval can then applied to all CT data sets (acquired from the same machine, using the same imaging protocol). If the first coordinate of the representative element is located in the threshold interval, the corresponding class is regarded as the colon wall class and all voxels in that class are labeled as colon wall-like voxels.

Each colon wall-like voxel is a candidate to be a colon wall voxel. There are three possible outcomes of not belonging to the colon wall. The first case relates to voxels which are close to the stool/liquid inside the colon. The second case occurs when voxels are in the lung tissue regions. The third case represents mucosa voxels. Clearly then, low level classification carries a degree of classification uncertainty. The causes of the low-level classification uncertainty vary. For example, a partial-volume effect resulting from voxels containing more than one material type (i.e., fluid and colon wall) leads to the first case of uncertainty. The second and the third cases of uncertainty are due to both the partial volume effect as well as the low contrast of CT images. To resolve the uncertainty, additional information is needed. Thus, a high-level feature extraction procedure is used in the present method to further distinguish candidates for the colon wall from other colon wall-like voxels, based on a priori anatomical knowledge of the CT images (step 1580).

Figure 18A:
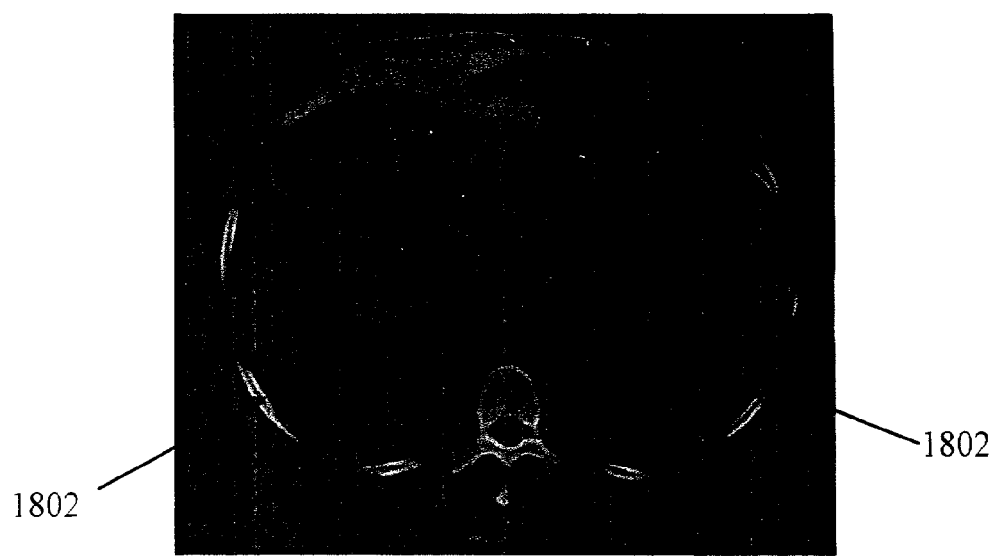
FIG. 18A is an exemplary image slice from a CT scan of a human abdominal region, primarily illustrating a region including the lungs.
Figure 18B:
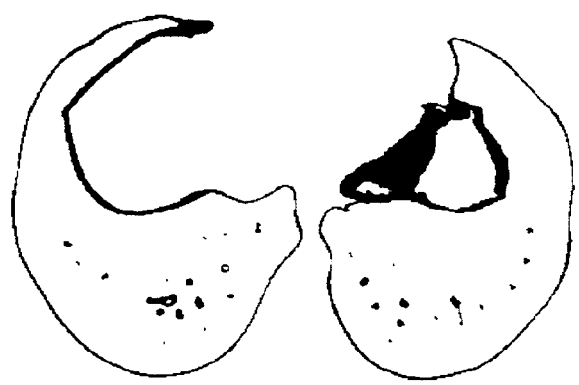
FIG. 18B is a pictorial diagram illustrating the identification of the lung region in the image slice of FIG. 18A.
Figure 18C:
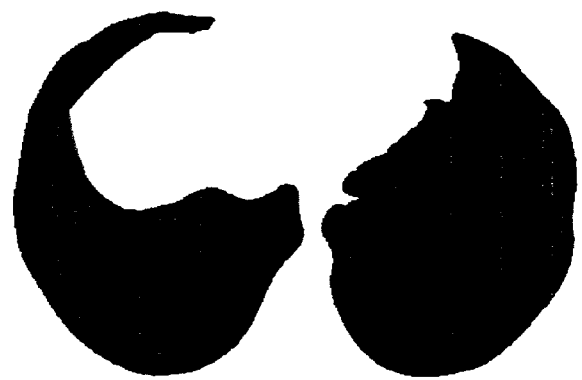
FIG. 18C is a pictorial diagram illustrating the removal of the lung volume identified in FIG. 18B.

An initial step of the high-level feature extraction procedure can be to eliminate the region of lung tissue from the low-level classification results. FIG. 18A is an exemplary slice image clearly illustrating the lung region 1802. The lung region 1802 is identifiable as a generally contiguous three dimensional volume enclosed by colon wall-like voxels, as illustrated in FIG. 18B. Given this characteristic, the lung region can be identified using a region growing strategy. The first step in this technique is to find a seed voxel within the region of growing. Preferably, the operator performing the CT imaging scan sets the imaging range such that the top most slice of the CT scan does not contain any colon voxels. As the interior of lung should be filled with air, the seed is provided by the low-level classification simply by selecting an air voxel. Once the lung region outline of FIG. 18B is determined, the lung volume can be removed from the image slice (FIG. 18C).

Figure 19A:
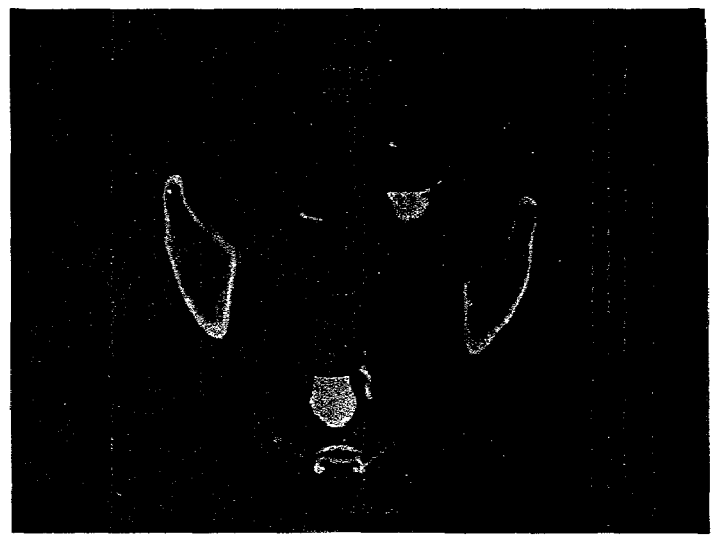
FIG. 19A is a exemplary image slice form a CT scan of a human abdominal region, primarily illustrating a region including a portion of the colon and bone.
Figure 19B:
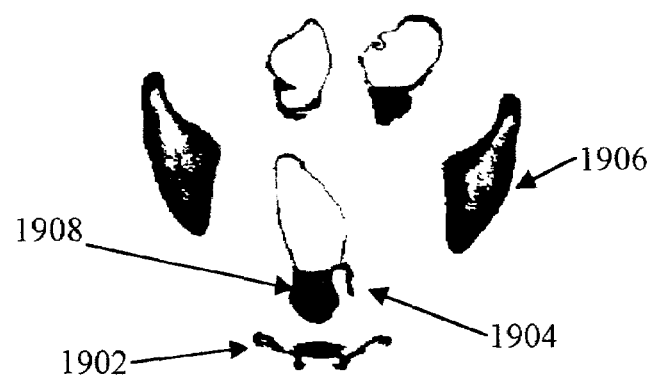
FIG. 19B is a pictorial diagram illustrating the identification of the colon and bone region from the image slice of FIG. 19A.
Figure 19C:
FIG. 19C is a pictorial diagram illustrating the image scan of FIG. 19a with the regions of bone removed.

A next step in performing high-level feature extraction can be to separate the bone voxels from enhanced stool/fluid voxels in cluster 2. The bone tissue voxels 1902 are generally relatively far away from the colon wall and resides outside the colon volume. To the contrary, the residual stool 1906 and fluid 1904 are enclosed inside the colon volume. Combining the a priori proximity information and the colon wall information obtained from the low-level classification process, a rough colon wall volume is generated. Any voxel separated by more than a predetermined number (e.g., 3) of voxel units from the colon wall, and outside the colon volume, will be labeled as bone and then removed from the image. The remaining voxels in cluster 2 can be assumed to represent stool and fluid within the colon volume (see FIGS. 19A–C).

The voxels within the colon volume identified as stool 1906 and fluid 1904 can be removed from the image to generate a clean colon lumen and colon wall image. In general, there are two kinds of stool/fluid regions. One region type is small residual areas of stool 1906 attached to the colon wall. The other region type is large volumes of fluid 1904, which collect in basin-like colonic folds (see FIGS. 19A–C).

The attached residual stool regions 1906 can be identified and removed because they are inside the rough colon volume generated during the low-level classification process. The fluid 1906 in the basin-like colon fold usually has a horizontal surface 1908 due to the effect of gravity. Above the surface is always a gas region, which exhibits a very high contrast to the fluid intensity. Thus, the surface interface of the fluid regions can be easily marked.

Using a region growing strategy, the contour of the attached stool regions 1906 can be outlined, and the part which is away from the colon wall volume can be removed. Similarly, the contour of the fluid regions 1904 can also be outlined. After eliminating the horizontal surfaces 1908, the colon wall contour is revealed and the clean colon wall is obtained.

It is difficult to distinguish the mucosa voxels from the colon wall voxels. Even though the above three dimensional processing can remove some mucosa voxels, it is difficult to remove all mucosa voxels. In optical colonoscopy, physicians directly inspect the colonic mucosa and search for lesions based on the color and texture of the mucosa. In virtual colonoscopy, most mucosa voxels on the colon wall can be left intact in order to preserve more information. This can be very useful for three dimensional volume rendering.

From the segmented colon wall volume, the inner surface, the outer surface and the wall itself of the colon can be extracted and viewed as a virtual object. This provides a distinct advantage over conventional optical colonoscopy in that the exterior wall of the colon can be examined as well as the interior wall. Furthermore, the colon wall and the colon lumen can be obtained separately from the segmentation.

Because the colon is substantially evacuated prior to imaging, a commonly encountered problem is that the colon lumen collapses in spots. While the inflation of the colon with compressed gas, such as air or $CO_2$, reduces the frequency of collapsed regions, such areas still occur. In performing a virtual colonoscopy, it is desirable to automatically maintain a flight path through the collapsed regions and it is also desirable to use the scanned image data to at least partially recreate the colon lumen in the collapsed regions. Since the above described image segmentation methods effectively derive both the interior and exterior of the colon wall, this information can be used to enhance the generation of the fly path through the collapsed regions.

In extending the flight path through collapsed regions of the colon or expanding a collapsed region of the colon, the first step is to detect a collapsed region. Using the premise that the greyscale values of the image data from around the outside of the colon wall change much more dramatically than the greyscale values within the colon wall itself, as well as in other regions such as fat, muscle and other kinds of tissue, an entropy analysis can be used to detect areas of colon collapse.

The degree of change in greyscale value, for example along the centerline, can be expressed and measured by an entropy value. To calculate an entropy value, voxels on the outer surface of the colon wall are selected. Such points are identified from the above described image segmentation techniques. A 5×5×5 cubic window can be applied to the pixels, centered on the pixel of interest. Prior to calculating the entropy value, a smaller (3×3×3) window can be applied to the pixels of interest in order to filter out noise from the image data. The entropy value of a selected window about the pixel can then be determined by the equation:

$$E = \sum_i C(i) \ln(C(i))$$

where E is the entropy and C(i) is the number of points in the window with the grayscale of i (i=0, 1, 2, ..., 255). The calculated entropy values for each window are then compared against a predetermined threshold value. For regions of air, the entropy values will be fairly low, when compared to regions of tissue. Therefore, along the centerline of the colon lumen, when the entropy values increase and exceed the predetermined threshold value, a collapsed region is indicated. The exact value of the threshold is not critical and will depend in part on the imaging protocol and particulars of the imaging device.

Once a collapsed region is detected, the previously determined centerline flight path can be extended through the region by piercing through the center of the collapse with a one voxel wide navigation line.

In addition to automatically continuing the flight path of the virtual camera through the colon lumen, the region of colon collapse can be virtually opened using a physical modeling technique to recover some of the properties of the collapsed region. In this technique, a model of the physical properties of the colon wall is developed. From this model, parameters of motion, mass density, damping density, stretching and bending coefficients are estimated for a Lagrange equation. Then, an expanding force model (i.e., gas or fluid, such as air, pumped into the colon) is formulated and applied in accordance with the elastic properties of the colon, as defined by the Lagrange equation, such that the collapsed region of the colon image is restored to its natural shape.

To model the colon, a finite-element model can be applied to the collapsed or obstructed regions of the colon lumen. This can be performed by sampling the elements in a regular grid, such as an 8 voxel brick, and then applying traditional volume rendering techniques. Alternatively, an irregular volume representation approach, such as tetrahedrons can be applied to the collapsed regions.

In applying the external force (air pumping) model to the colon model, the magnitude of the external force is first determined to properly separate the collapsed colon wall regions. A three dimensional growing model can be used to trace the internal and external colon wall surfaces in a parallel manner. The respective surfaces are marked from a starting point at the collapsed region to a growing source point, and the force model is applied to expand the surfaces in a like and natural manner. The region between the internal and external surfaces, i.e., the colon wall, are classified as sharing regions. The external repulsive force model is applied to these sharing regions to separate and expand the collapsed colon wall segments in a natural manner.

To more clearly visualize the features of a virtual object, such as the colon, which is subjected to virtual examination, it is advantageous to provide a rendering of the various textures of the object. Such textures, which can be observed in the color images presented during optical colonoscopy, are often lost in the black and white, grey scale images provided by the CT image data. Thus a system and method for texture imaging during virtual examination is required.

Figure 20:
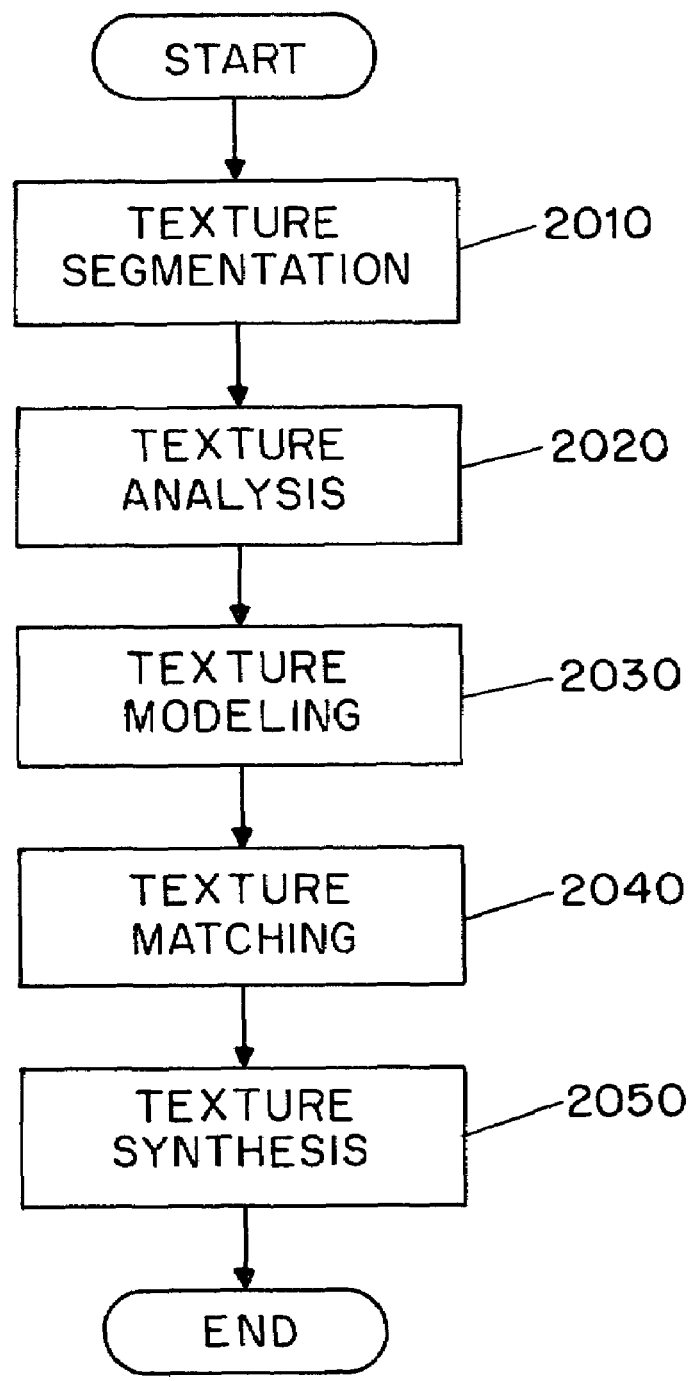
FIG. 20 is a flowchart illustrating a method for applying texture to monochrome image data.

FIG. 20 is a flow chart depicting a present method for generating virtual objects having a texture component. The purpose of this method is to map textures obtained by optical colonoscopy images in the red-green-blue (RGB) color space, as for example from the Visible Human, onto the gray scale monochrome CT image data used to generate virtual objects. The optical colonoscpsy images are acquired by conventional digital image acquistion techniques, such as by a digital "frame grabber" 1429 which receives analog optical images from a camera, such as a video camera, and converts the image to digital data which can be provided to CPU 1423 via interface port 1431 (FIG. 14). The first step in this process is to segment the CT image data (step 2010). The above described image segmentation techniques can be applied to choose intensity thresholds in the grey scale image to classify the CT image data into various tissue types, such as bone, colon wall tissue, air, and the like.

In addition to performing image segmentation on the CT image data, the texture features of the optical image need to be extracted from the optical image data (step 2020). To do this, a gausian filter can be applied to the optical image data followed by subsampling to decompose the data into a multiresolutional pyramid. A laplacian filter and steerable filter can also be applied to the multiresolutional pyramid to obtain oriented and non-oriented features of the data. While this method is effective at extracting and capturing the texture features, the implementation of this approach requires a large amount of memory and processing power.

An alternative approach to extracting the texture features from the optical image is to utilize a wavelet transform. However, while wavelet transformations are generally computationally efficient, conventional wavelet transforms are limited in that they only capture features with orientations parallel to the axes and cannot be applied directly to a region of interest. To overcome these limitations, a non-separable filter can be employed. For example, a lifting shcme cam be employed to build filter banks for wavelets transform in any dimension using a two step, prediction and updating approach. Such filter banks can be synthesized by the Boor-Rom algorithm for multidimensional polynomial interpolation.

After the textural features are extracted from the optical image data, models must be generated to describe these features (step 2030). This can be performed, for example, by using a non-parametric multi-scale statistical model which is based on estimating and manipulating the entropy of non-Gaussian distributions attributable to the natural textures.

Once texture models are generated from the optical image data, texture matching must be performed to correlate these models to the segmented CT image data (step 2050). In regions of the CT image data where the texture is continuous, corresponding classes of texture are easily matched. However, in boundary regions between two or more texture regions, the process is more complex. Segmentation of the CT data around a boundary region often leads to data which is fuzzy, i.e., the results reflect a percentage of texture from each material or tissue and vary depending on the various weighting of each. The weighting percentage can be used to set the importance of matching criteria.

In the case of the non-parametric multi-scale statistical model, the cross entropy or a Kullback-Leiber divergance algorithm can be used to measure the distribution of different textures in a boundary region.

After texture matching, texture synthesis is performed on the CT image data (step 2050). This is done by fusing the textures from the optical image data in to the CT image data. For isotropic texture patterns, such as presented by bone, the texture can be sampled directly from the optical data to the segmented CT image data. For unisotropic texture regions, such as colon mucosa, a multiresolution sampling procedure is preferred. In this process, selective resampling for homogenous and heterogenous regions is employed.

In addition to enhanced imaging, the above described techniques can also form the basis of a system for performing virtual electronic biopsy of a region being examined to effect a flexible and non-invasive biopsy. Volume rendering techniques employ a defined transfer function to map different ranges of sample values of the original volume data to different colors and opacities. Once a suspicious area is detected during virtual examination, the physician can interactively change the transfer function used during the volume rendering procedure such that the wall being viewed becomes substantially transparent and the interior of the area can be viewed.

In addition to performing virtual biopsy, the present system and methods can be extended to perform automated polyp detection. Polyps which occur, for example, within the colon, are generally small convex hill-like structures extending from the colon wall. This geometry is distinct from the fold of the colon wall. Thus, a differential geometry model can be used to detect such polyps on the colon wall.

The surface of the colon lumen can be represented using a C-2 smoothness surface model. In this model, each voxel on the surface has an associated geometrical feature which has a Gaussian curvature, referred to as Gaussian curvature fields. A convex hill on the surface, which may be indicative of a polyp, possesses a unique local feature in the Gaussian curvature fields. Accordingly, by searching the Gausian curvature fields for specific local features, polyps can be detected.

Each of the foregoing methods can be implemented using a system as illustrated in FIG. 14, with appropriate software being provided to control the operation of CPU 1409 and CPU 1423.

The foregoing merely illustrates the principles of the invention. It will thus be appreciated that those skilled in the art will be able to devise numerous systems, apparatus and methods which, although not explicitly shown or described herein, embody the principles of the invention and are thus within the spirit and scope of the invention as defined by its claims.

For example, the methods and systems described herein could be applied to virtually examine an animal, fish or inanimate object. Besides the stated uses in the medical field, applications of the technique could be used to detect the contents of sealed objects which cannot be opened. The technique could also be used inside an architectural structure such as a building or cavern and enable the operator to navigate through the structure.

We claim:

1. A method of mapping optical texture properties from at least one optical image to an acquired monochrome data set comprising:
    segmenting the acquired monochrome data set into a plurality of classifications representing a plurality of textures;
    segmenting the optical image into a plurality of color classifications representing a second plurality of textures;
    generating a texture model for the plurality of color classifications;
    matching the texture models to the plurality of classifications of the monochrome image data; and
    applying the texture models to the monochrome image data.

2. An imaging system for mapping optical texture properties from at least one optical image to an acquired monochrome data set comprising:
    an imaging scanner for acquiring the monochrome data set;
    a processor, said processor segmenting the acquired monochrome data set into a plurality of classifications representing a plurality of textures, segmenting the optical image into a plurality of color classifications representing a second plurality of textures, generating a texture model for the plurality of color classifications, matching the texture models to the plurality of classifications of the monochrome image data, and applying the texture models to the monochrome image data; and
    a display unit operatively coupled to the processor for displaying a representation of the image data with the texture models applied.

3. The imaging system for mapping optical texture properties according to claim 2, wherein the imaging scanner is a computed tomography scanner.

4. The imaging system for mapping optical texture properties according to claim 2, wherein the imaging scanner is a magnetic resonance imaging scanner.

5. The imaging system for mapping optical texture properties according to claim 2, wherein the image data with the texture models applied is a color representation of the object being imaged.

* * * * *